(12) United States Patent
van Deventer et al.

(10) Patent No.: US 9,860,572 B2
(45) Date of Patent: Jan. 2, 2018

(54) SPATIALLY SEGMENTED CONTENT DELIVERY

(75) Inventors: Mattijs Oskar van Deventer, Leidschendam (NL); Omar Aziz Niamut, Viaardingen (NL); Anton Havekes, Schiedam (NL); Martin Prins, The Hague (NL); Ray van Brandenburg, The Hague (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 14/122,198

(22) PCT Filed: Jun. 7, 2012

(86) PCT No.: PCT/EP2012/060801
§ 371 (c)(1),
(2), (4) Date: Nov. 25, 2013

(87) PCT Pub. No.: WO2012/168365
PCT Pub. Date: Dec. 13, 2012

(65) Prior Publication Data
US 2014/0089990 A1    Mar. 27, 2014

(30) Foreign Application Priority Data
Jun. 8, 2011   (EP) .................... 11169068

(51) Int. Cl.
*H04N 5/445*   (2011.01)
*H04N 7/173*   (2011.01)
(Continued)

(52) U.S. Cl.
CPC ..... *H04N 21/234363* (2013.01); *H04L 29/06* (2013.01); *H04L 65/4084* (2013.01);
(Continued)

(58) Field of Classification Search
CPC ....... H04N 21/234363; H04N 21/2356; H04N 21/440263
(Continued)

(56) References Cited

U.S. PATENT DOCUMENTS 7,447,792 B2   11/2008   Brun
7,518,053 B1 *  4/2009   Jochelson et al. .............. 84/609
(Continued)

FOREIGN PATENT DOCUMENTS

EP    2 081 384 A2    7/2009
JP    2007-324783     12/2007
(Continued)

OTHER PUBLICATIONS

Mavlankar, Aditya et al., "An Interactive Region-of-Interest Video Streaming System for Online Lecture Viewing", 2010 18th International Packet Video Workshop, Dec. 13, 2010, pp. 64-71.
(Continued)

*Primary Examiner* — Pankaj Kumar
*Assistant Examiner* — Franklin Andramuno
(74) *Attorney, Agent, or Firm* — McDonnell Boehnen Hulbert & Berghoff LLP

(57) ABSTRACT

Methods and systems are described for processing spatially segmented content originating from a content delivery network. One method comprises a client in a media processing device receiving a spatial manifest information comprising one or more spatial representations of a source stream, each spatial representation identifying one or more spatial segment streams, location information for locating one or more delivery nodes in said content delivery network and, optionally, position information for stitching spatial segment frames in said segment streams into a video frame for display; selecting one or more spatial segment streams and on the basis of said spatial manifest information requesting (Continued)

at least one delivery node in said content delivery network to transmit said one or more selected spatial segment streams to said client; and, receiving said one or more selected spatial segment streams from said at least one delivery node.

16 Claims, 18 Drawing Sheets

(51) Int. Cl.
| | |
|---|---|
| H04N 21/2343 | (2011.01) |
| H04N 21/235 | (2011.01) |
| H04N 21/4402 | (2011.01) |
| H04N 21/218 | (2011.01) |
| H04N 21/4728 | (2011.01) |
| H04N 21/6587 | (2011.01) |
| H04L 29/06 | (2006.01) |
| H04L 29/08 | (2006.01) |

(52) U.S. Cl.
CPC ........... *H04L 67/18* (2013.01); *H04N 21/218* (2013.01); *H04N 21/2356* (2013.01); *H04N 21/440263* (2013.01); *H04N 21/4728* (2013.01); *H04N 21/6587* (2013.01)

(58) Field of Classification Search
USPC .................................................... 725/61, 115
See application file for complete search history.

(56) References Cited

U.S. PATENT DOCUMENTS

| | | | | |
|---|---|---|---|---|
| 2003/0229900 | A1* | 12/2003 | Reisman | 725/87 |
| 2004/0073596 | A1 | 4/2004 | Kloninger et al. | |
| 2006/0020989 | A1 | 1/2006 | Brun | |
| 2007/0024706 | A1 | 2/2007 | Brannon, Jr. et al. | |
| 2007/0086669 | A1* | 4/2007 | Berger | G06K 9/2081 |
| | | | | 382/243 |
| 2007/0280108 | A1 | 12/2007 | Sakurai | |
| 2009/0060043 | A1 | 3/2009 | Nuyttens | |
| 2009/0300692 | A1 | 12/2009 | Mavlankar et al. | |
| 2010/0169303 | A1 | 7/2010 | Biderman et al. | |
| 2010/0232504 | A1 | 9/2010 | Feng | |
| 2010/0262618 | A1* | 10/2010 | Hedinsson et al. | 707/770 |
| 2010/0262913 | A1 | 10/2010 | Takagi | |
| 2011/0069906 | A1* | 3/2011 | Park | G06T 5/50 |
| | | | | 382/284 |
| 2011/0082924 | A1 | 4/2011 | Gopalakrishnan | |
| 2011/0083073 | A1* | 4/2011 | Atkins et al. | 715/704 |
| 2012/0023251 | A1* | 1/2012 | Pyle et al. | 709/231 |

FOREIGN PATENT DOCUMENTS

| | | |
|---|---|---|
| JP | 2009-212821 | 9/2009 |
| JP | 2010-154074 | 7/2010 |
| WO | 2010/078281 A2 | 7/2010 |
| WO | 2011047335 A1 | 4/2011 |

OTHER PUBLICATIONS

Makar, Mina et al., "Real-Time Video Streaming With Interactive Region-of-Interest", Proceedings of 2010 IEEE 17th International Conference on Image Processing, Sep. 26-29, 2010, Hong Kong, pp. 4437-4440.
Zambelli, Alex, "IIS Smooth Streaming Technical Overview", Retrieved from internet: URL:http://img.prodek.It/documents/IIS_Smooth_Streaming_Technical_Overview.pdf, retrieved Oct. 12, 2011, pp. 1-17.
"Synchronized Multimedia Integration Language (SMIL 2.0): 5. The SMIL 2.0 Layout Modules", Aug. 7, 2001, Internet Citation, retrieved from the internet: URL:http://www.w3.org/TR/2001/REC-smil20-20010807/layout.html, retrieved Jul. 10, 2009, pp. 1-29.
European Search Report, European Patent Application No. 11169068.1, dated Dec. 23, 2011.
Noh, Jeonghun et al., "Standford Peer-to-Peer Multicast (SPPM) Overview and Recent Extensions", Picture Coding Symposium, 2009 IEEE, May 6, 2009, pp. 1-4.
Partial European Search Report, European Patent Application No. 11169068.1, dated Oct. 10, 2011.
PCT International Search Report and Written Opinion, PCT International Application No. PCT/EP2012/060801, dated Jul. 27, 2012.
"Telecommunications and Internet Converged Services and Protocols for Advanced Networking (TISPAN); Content Delivery Network (CDN) Architecture", ETSI TS 182 019, V3.1.1, Jun. 2011, pp. 1-82.
Partial International Search Report (Form PCT/ISA/206 and Annex to Form PCT/ISA/206), PCT International Application No. PCT/EP2012/060801, mailed Jul. 5, 2012 (9 pages).
Lei, Zhibin et al., "Video Segmentation Using Spatial and Temporal Statistical Analysis Method", 2000 IEEE International Conference on Multimedia and Expo, ICME 2000, vol. 3, Jul. 30-Aug. 2, 2000, pp. 1527-1530.
Hsiao, Chia-Wei et al., "Hybrid Multiple Description Coding Based on H.264", IEEE Transactions on Circuits and Systems for Video Technology, vol. 20, No. 1, Jan. 2010, pp. 76-87.
Grois, Dan et al., "Dynamically Adjustable and Scalable ROI Video Coding", 2010 IEEE International Symposium on Broadband Multimedia Systems and Broadcasting (BMSB), 2010, pp. 1-5.
Mavlankar, Aditya, "Interactive TV With Virtual Pan/Tilt/Zoom", YouTube, https://www.youtube.com/watch?v=Ko9jcljBXnk, printed from the World Wide Web on Apr. 14, 2015, 2 pages.
DigInfo TV, "KDDI R&D Labs Three Screen Service Platform: DigInfo", YouTube, https://www.youtube.com/watch?v=urjQjR5VK_Q, printed from the World Wide Web on Apr. 14, 2015, 2 pages.
Pantos, R. et al., "HTTP Live Streaming draft-pantos-http-live-streaming-04", Informational Internet-Draft, Jun. 5, 2010, pp. 1-22.
Mavlankar, Aditya, "Peer-to-Peer Video Streaming With Interactive Region-of-Interest", Dissertation Submitted to the Department of Electrical Engineering and the Committee on Graduate Studies of Stanford University, Apr. 2010, 158 pages.
"3rd Generation Partnership Project: Technical Specification Group Services and System Aspects; Transparent End-to-End Packet-Switched Streaming Service (PSS); Protocols and Codecs (Release 9)", 3GPP TS 26.234 V9.4.0, Sep. 2009, pp. 1-187.
Google Maps Javascript API v3, https://developers.google.com/maps/documentation/javascript/?csw=1#Tile_Overlays, printed from the World Wide Web on Apr. 14, 2015, 3 pages.
"HD View SL", Microsoft Research HD View SL, http://research.microsoft.com/en-us/um/redmond/groups/ivm/HDViewSL, printed from the World Wide Web on Apr. 14, 2015, 1 page.
Harwood, Aaron, "Hashing Spatial Content Over Peer-to-Peer Networks", In Proceedings, Australian Telecommunications, Networks and Applications Conference, Melbourne, 2003, 5 pages.
Feng, Wu-chi et al., "Supporting Region-of-Interest Cropping Through Constrained Compression", MM '08 Proceedings of the 16th ACM International Conference on Multimedia, 2008, pp. 745-748.
Gharai, Ladan et al., "Scaling Video Conferencing Through Spatial Tiling", NOSSDAV'01, Jun. 25-27, 2001, 7 pages.
Khiem, Ngo Quang Minh et al., "Supporting Zoomable Video Streams With Dynamic Region-of-Interest Cropping", MMSys'10, Feb. 22-23, 2010, pp. 259-270.
English Translation of Notice of Reason for Rejection, Japanese Patent Application 2014-514071, dated Jan. 7, 2015.
Stockhammer, Thomas, Qualcomm, "Dynamic Adaptive Streaming Over HTTP—Design Principles and Standards", MMSYS 2011 Technical Program, Feb. 24, 2011, retrieved from World Wide Web on Jan. 11, 2017 (http://web.cs.wpi.edu/~claypool/mmsys-2011/Day2-1_3GPPPDynamic.pdf), 24 pages.

(56) References Cited

OTHER PUBLICATIONS

Mavlankar, Aditya et al., "Optimal Slice Size for Streaming Regions of High-Resolution Video With Virtual Pan/Tilt/Zoom Functionality", Information Systems Laboratory, Standard University, Sep. 6, 2007, pp. 1-24.

Mavlankar, Aditya et al., "Optimal Slice Size for Streaming Regions of High-Resolution Video With Virtual Pan/Tilt/Zoom Functionality", 15th European Signal Processing Conference, Sep. 3-7, 2007, 5 pages.

Makar, Mina, "Compression-Aware Digital Pan/Tilt/Zoom", Proceedings of the 43rd Asilomar Conference on Signals, Systems and Computers, Pacific Grove, California, Nov. 1-4, 2009, 5 pages.

Mavlankar, Aditya et al., "Video Streaming With Interactive Pan/Tile/Zoom", High-Quality Visual Experience, Creation, Processing and Interactivity of High-Resolution and High-Dimensional Video Signals, Copyright 2010, Publisher Springer Berlin Heidelberg, 26 pages.

Mavlankar, Aditya et al., "Peer-to-Peer Multicast Live Video Streaming With Interactive Virtual Pan/Tilt/Zoom Functionality", 15th IEEE International Conference on Image Processing, Oct. 12-15, 2008, 4 pages.

Mavlankar, Aditya et al., "Pre-Fetching Based on Video Analysis for Interactive Region-of-Interest Streaming of Soccer Sequences", International Conference on Image Processing, Dec. 2009, 4 pages.

Mavlankar, Aditya et al., "Optimal Server Bandwidth Allocation for Streaming Multiple Streams Via P2P Multicast", IEEE 10th Workshop on Multimedia Signal Processing, Oct. 8-10, 2008, 6 pages.

Mavlankar, Aditya et al., "Background Extraction and Long-Term Memory Motion-Compensated Prediction for Spatial-Random-Access-Enabled Video Coding", Picture Coding Symposium, May 6-8, 2009, 4 pages.

Mavlankar, Aditya et al., "Region-of-Interest Prediction for Interactively Streaming Regions of High Resolution Video", Packet Video 2007, Nov. 12-13, 2007, 10 pages.

* cited by examiner

```
<Video>
<Name>source1.m2ts</Name>
<Representation>
    <RepresentationLevel>1</RepresentationLevel>
    <RepresentationResolution>1024x54</RepresentationResolution>
    <segment_mode==OFF>
    <VideoURL>rtsp://video.content.com/full_stream.avi</VideoURL>
</Representation>
<Representation>
    <RepresentationLevel>2</RepresentationLevel>
    <RepresentationResolution>4096x2160</RepresentationResolution>
    <NumberOfColumns>2</NumberOfColumns>
    <Column>
        <NumberOfRows>2</NumberOfRows>
        <Row>
            <SegmentResolution>2048x1080</SegmentResolution>
            <SegmentURL>rtsp://video.content.com/stream1_1.avi</SegmentURL>
            <SyncInfo_RtpOffset>12010</SyncInfo_RtpOffset>
        </Row>
        <Row>
        ...
        </Row>
        ...
    </Column>
    <Column>
    ...
    </Column>
    ...
</Representation>
<Representation>
    <RepresentationLevel>3</RepresentationLevel>
    <RepresentationResolution>7680x4320</RepresentationResolution>
    <NumberOfColumns>4</NumberOfColumns>
    <Column>
    ...
</Representation>
</Video>
```

Figure 4

A:
```
<Representation>
<RepresentationLevel>1</RepresentationLevel>
<RepresentationResolution>4096x2160</RepresentationResolution>
<Block x=1000 y=500 height=200 width=300>
  <SegmentURL>rtsp://video.content.com/stream1000_500</SegmentURL>
  ...
</Block>
<Block x=1100 y=500 height=200 width=300>
  ...
</Block>
...
</Representation>
```

B:
```
<Representation>
<RepresentationLevel>1</RepresentationLevel>
<RepresentationResolution>4096x2160</RepresentationResolution>
<Block x=1000 y=500 height=200 width=300>
  <SegmentURL>rtsp://video.content.com/stream1000_500</SegmentURL>
  <AssociatedSegment representationlevel=2>500,250,100,150</AssociatedSegment>
  <AssociatedSegment representationlevel=3>250,125,50,75</AssociatedSegment>
  ...
</Block>
...
</Representation>
```

C:
```
<Representation>
<RepresentationLevel>1</RepresentationLevel>
<RepresentationResolution>4096x2160</RepresentationResolution>
<NormalizedBlock x=0.1 y=0.3 height=0.05 width=0.07>
  <SegmentURL>rtsp://video.content.com/stream1000_500</SegmentURL>
  ...
</NormalizedBlock>
...
</Representation>
```

Figure 7

SPATIALLY SEGMENTED CONTENT DELIVERY

CROSS REFERENCE TO RELATED APPLICATIONS

The present application is a national stage entry of PCT/EP2012/060801, filed Jun. 7, 2012, and claims priority to EP 11169068.1, filed Jun. 8, 2011. The full disclosures of EP 11169068.1 and PCT/EP2012/060801 are incorporated herein by reference.

FIELD OF THE INVENTION

The invention relates to spatially-segmented content delivery and, in particular, though not exclusively, to methods and systems for processing spatially-segmented content, a content delivery network configured to distribute spatially-segmented content, a client configured for processing spatially-segmented content, a data structure for controlling spatially-segmented content in a client or a content delivery network and a computer program product using such method.

BACKGROUND OF THE INVENTION

New production equipment is starting to become available that allows capturing and transmission of wide-angle, very high resolution video content. The processing of such media files requires high bandwidths (order of Gbps) and in order to exploit the full information in such video stream large video screens, typically the size of a video wall or a projection screen, should be used.

When watching video on a relatively small display, a user is not able not watch the entire video frame and all information contained therein. Instead, based on his or her preference a user will select a particular frame area, viewing angle or video resolution by interacting with the graphical user interface of the user equipment. Apart from the fact that current network capacity cannot handle the large bandwidth demands of these beyond-HD resolutions, it is simply not efficient to deliver content that will not be displayed on the screen anyway.

Mavlankar et al. describe in the article "An interactive region-of-interest video streaming system for online lecturing viewing", proceeding of ICIP 2010, p. 4437-4440 a so-called tiled video system wherein multiple resolution layers of a video content file are generated using a server-based interactive Region-of-Interest encoder. Every layer is divided into multiple spatial segments or tiles, each of which can be encoded and distributed (i.e. streamed) independently from each other.

A video client may request a specific spatial region, a Region of Interest (ROI), and a server may subsequently map the ROI request to one or more segments and transmit a selected group of tiled streams to the client, which is configured to combine the tiled streams into one video. This way bandwidth efficient user-interactions with the displayed content, e.g. zooming and panning, may be achieved without requiring compromises with respect to the resolution of the displayed content. In such scheme however fast response and processing of the tiled streams is necessary in order to deliver quality of services and optimal user experience.

When implementing such services in existing large-scale content delivery schemes problems may occur. Typically, a content provider does not directly deliver content to a consumer. Instead, content is sent to a content distributor, which uses a content delivery network (CDN) to deliver content to the consumer. CDNs are not arranged to handle spatially segmented content. Moreover, known solutions for delivering spatially segmented content to a client (such as described in the article of Mavlankar) are not suitable for use with existing CDNs. Implementing a known server-based solution for resolving ROI requests in a CDN in which spatially segmented content may be stored at different locations, does not provide a scalable solution and may easily lead undesired effects such as overload and delay situations which may seriously compromise the realisation of such service.

Furthermore, the server-based ROI to tile mapping approach described by Mavlankar does not enable the possibility of a client accessing content through two separate access methods/protocols, such as a scenario in which some spatial segments (segment streams) may be received using broadcast or multicast as access technology (medium) and some other spatial segments may be received using for instance unicast as access technology. The server-based ROI mapping mechanism of Mavlankar will have no knowledge of the exact client-side capabilities for receiving segmented content via different access technologies and or access protocols.

Moreover, in order to handle and display a video stream on the basis of several spatially-segmented streams, specific functionality needs to be implemented in the client in order to enable the display of seamless video images on the basis of a number of spatial segment streams and to enable user-interaction with the displayed content.

Hence, there is a need in the prior art for efficient spatially-segmented content delivery to clients. In particular, there is a need for methods and systems for spatially-segmented content delivery systems which allow content delivery without requiring changes to conventional CDN infrastructure, and which may also provide a scalable and flexible solution for users interacting with high-resolution video content.

SUMMARY OF THE INVENTION

It is an object of the invention to reduce or eliminate at least one of the drawbacks known in the prior art and to provide in a first aspect of the invention a method for for processing spatially segmented content comprising: a client receiving a spatial manifest data structure comprising one or more spatial representations of a source stream, each spatial representation identifying one or more spatial segment streams and location information for locating one or more delivery nodes, such one or more delivery nodes preferably associated with a content delivery network configured to transmit said one or more spatial segment streams to said client; selecting one or more spatial segment streams associated with at least one of said spatial representations and, on the basis of said location information, requesting at least one delivery node, preferably associated with said content delivery network, to deliver said at least one selected spatial segment stream to said client; and,
receiving said one or more selected spatial segment streams from said at least one delivery node.

The spatial manifest data structure (file) allows efficient client-based video manipulation actions, including zooming, tilting and panning of video data wherein the functionality in the network, in particular in the CDN, can be kept simple when compared to prior art solutions.

In one embodiment said spatial manifest data structure may further comprise positioning information for stitching spatial segment frames in said spatial segment streams into a video frame for display.

In another embodiment said spatial manifest data structure may comprises at least a first spatial representation associated with a first resolution version of said source stream and at least a second spatial representation associated with a second resolution version of said source stream.

In an embodiment said spatial manifest data structure may comprise a first spatial representation associated with a first number of segment streams and said second spatial representation comprises a second number of segment streams.

In another embodiment said method may further comprise: buffering said one or more selected spatial segment streams; receiving synchronization information associated with said one or more spatial segment streams; synchronizing said one or more requested spatial segment streams on the basis of said synchronization information.

In one embodiment said method may comprise: on the basis of location information stitching said spatially aligned spatial segment frames into a continuous video frame for play-out.

In a further embodiment said one or more requested spatial segment streams may be transmitted to said client using an adaptive streaming protocol, preferably an HTTP adaptive streaming protocol, wherein at least part of said spatial segment streams is divided in time segments.

In yet further embodiment said one or more segment streams may be transmitted to said client using an RTP streaming protocol and wherein synchronization information is transmitted to said client in an RTSP signaling message.

In a further embodiment said spatial manifest data structure contains references to one or more access technologies or protocols (e.g. unicast, multicast, broadcast), said references preferably associated with one or more, preferably spatial, segment streams.

In a further embodiment said one or more segment streams may be transmitted to the client, using one or more of said access technologies and/or access protocols. For example, some segments streams may be transmitted using a broadcast medium (e.g. broadcast, multicast) as access technology, whereas some other segment streams may be transmitted using unicast as access technology.

In yet another embodiment the spatial manifest data structure (file) may be received, preferably by the clientover a broadcast medium, such as multicast or broadcast.

In a further embodiment the spatial manifest data structure (file) may be transmitted to multiple receivers (e.g. clients) simultaneously over a broadcast medium (e.g. simulcast).

In a further aspect the invention may relate to a method for user-interaction with spatially segmented content displayed to a user by a client in media processing device, said method comprising: receiving a spatial manifest data structure comprising one or more spatial representations of a source stream, each spatial representation identifying one or more spatial segment streams and location information for locating one or more delivery nodes associated with a content delivery network configured to transmit said one or more spatial segment streams to said client; on the basis of said location information said spatial manifest data structure, retrieving one or more spatial segment streams associated with a first spatial representation from said content delivery network and displaying said one or more spatial segment streams; receiving user input associated with a region of interest, said region of interest defining a selected area of said displayed spatially-segmented content; on the basis of positioning information in said spatial segment data structure and said region of interest determining a second spatial representation in accordance with one or more media processing criteria, preferably said processing criteria including at least one of bandwidth, screen resolution and/or encoding quality.

In one embodiment said method may further comprise for said one or more spatial representations determining the spatial segment frames overlapping said selected region of interest In a further aspect the invention may relate to a method for ingesting spatially segmented content originating from at least one source node into a first content delivery network, preferably said at least one source node being associated with a second content delivery network, the method comprising: receiving a spatial manifest data structure comprising one or more spatial representations of a source stream, each spatial representation identifying one or more spatial segment streams and location information for locating one or more delivery nodes associated with a content delivery network configured to transmit said one or more spatial segment streams to said client, said at least one source node configured to transmit said one or more spatial segment streams to said first content delivery network, distributing said at least one spatial segment stream to one or more delivery nodes in said first content delivery network; and, updating said spatial manifest information by adding location information associated with said one or more delivery nodes to said spatial manifest information.

In another aspect the invention may relate to a content distribution network arranged for distribute spatially segmented content, said network comprising: a control function, an ingestion node and one or more delivery nodes; wherein said control function is configured to receive a spatial manifest data structure comprising one or more spatial representations of a source stream, each spatial representation identifying one or more spatial segment streams and location information for locating one or more delivery nodes associated with a content delivery network configured to transmit said one or more spatial segment streams to said client; and wherein said control function is configured to request said one or more spatial segment streams from said one or more source nodes on the basis of said location information; wherein said ingestion node is configured to receive one or more spatial segment streams from said one or more source nodes; and, wherein said one or more delivery nodes are configured to receive said ingested one or more spatial segment streams.

In a further aspect, the invention may relate to a control function configured to receive a spatial manifest data structure comprising one or more spatial representations of a source stream, each spatial representation identifying one or more spatial segment streams and location information for locating one or more delivery nodes associated with a content delivery network configured to transmit said one or more spatial segment streams to said client; and configured to request said one or more spatial segment streams from said one or more source nodes on the basis of said location information.

The invention may further relate to a client for processing spatially segmented content, wherein the client is configured for: receiving a spatial manifest data structure comprising one or more spatial representations of a source stream, each spatial representation identifying one or more spatial segment streams and location information for locating one or more delivery nodes associated with a content delivery network configured to transmit said one or more spatial segment streams to said client; selecting one or more spatial segment streams and on the basis of said location information requesting at least one delivery node in said content delivery network to transmit said one or more selected spatial segment streams to said client; and, receiving said one or more selected spatial segment streams from said at least one delivery node.

In one embodiment said client is further configured for buffering said one or more selected spatial segment streams; receiving synchronization information associated with said one or more spatial segment streams; and synchronizing said one or more requested spatial segment streams on the basis of said synchronization information.

In another embodiment said client is further configured for stitching spatial segment frames on position information in said spatial manifest data structure.

The invention may further relate to a spatial manifest data structure for use in a client of a play-out device, preferably a client as described above, said data structure controlling the retrieval and display of spatially segmented content originating from a content delivery network, wherein said data structure comprises one or more spatial representations of a source stream, each spatial representation identifying one or more spatial segment streams, location information for locating one or more delivery nodes in said content delivery network and, optionally, position information for stitching spatial segment frames in said segment streams into a video frame for display.

The invention may also relate to a spatial manifest data structure for use by a content delivery network, preferably a content delivery network as described above, said spatial manifest data structure controlling the ingestion of spatially segmented content, wherein said data structure comprises one or more spatial representations of a source stream, each spatial representation identifying one or more spatial segment streams, location information for locating said one or more source nodes and, optionally, position information for stitching spatial segment frames in said segment streams into a video frame for display.

The invention also relates to a computer program product comprising software code portions configured for, when run in the memory of computer, executing at least one of the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 4 depicts an example of part of an SMF according to an embodiment of the invention.

FIG. 7A-7C depict parts of SMFs according to various embodiments of the invention.

DETAILED DESCRIPTION

Figure 1:
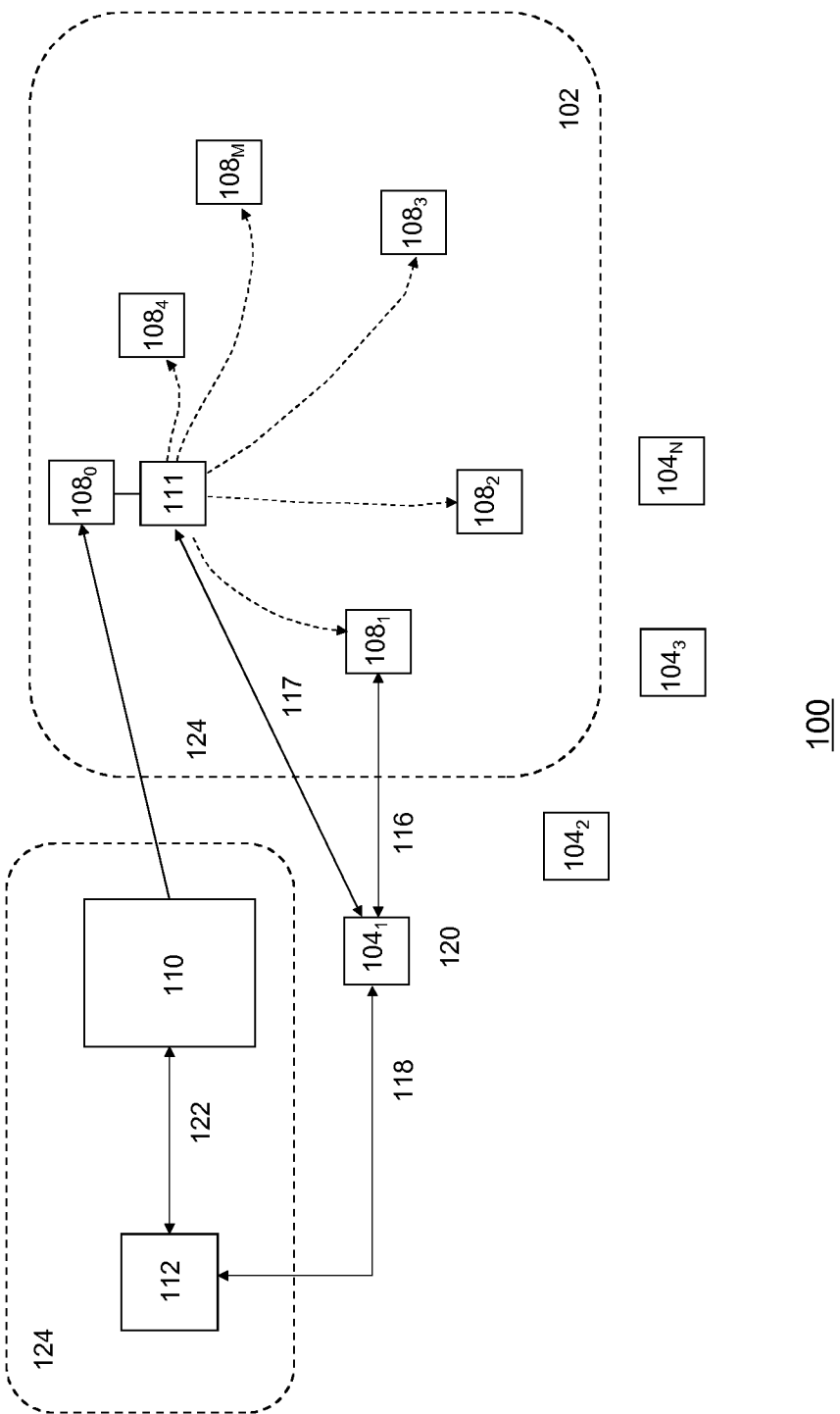
FIG. 1 depicts a segmented content delivery system according to an embodiment of the invention.

FIG. 1 depicts a content delivery system 100 for delivering spatially segmented content to a client according to one embodiment of the invention. The content delivery system may comprise a content delivery network (CDN) 102, a content provider system (CPS) 124 and a number of clients $104_{1-N}$. The CPS may be configured to offer content, e.g. a video title, to customers, which may purchase and receive the content using a client hosted on a terminal.

A terminal may generally relate to a content processing device, e.g. a (mobile) content play-out device such as an electronic tablet, a smart-phone, a notebook, a media player, etc. In some embodiment, a terminal may be a set-top box or content storage device configured for processing and temporarily storing content for future consumption by a content play-out device.

Delivery of the content is realized by the delivery network (CDN) comprising delivery nodes $108_{1-M}$ and at least one ingestion node $108_0$. A CDN control function (CDNCF) 111 is configured to receive content from an external content source, e.g. a content provider 110 or another CDN (not shown). The CDNCF may further control the ingestion node to distribute one or more copies of the content to the delivery nodes such that throughout the network sufficient bandwidth for content delivery to a terminal is guaranteed. In one embodiment, the CDN may relate to a CDN as described in ETSI TS 182 019.

A customer may purchase content, e.g. video titles, from the content provider by sending a request 118 to a web portal (WP) 112, which is configured to provide title references identifying purchasable content. In response to the request, a client may receive at least part of the title references from the WP and location information, e.g. an URL, of a CDNCF of a CDN, which is able to deliver the selected content. The CDNCF may send a client location information associated with at least one delivery node in the CDN, which are able to deliver the selected content to the client. Typically, the CDNCF will select a delivery node in the CDN, which is best suited for delivering the selected content to the client. Criteria for selecting a delivery node may include location of the client and the processing load of the delivery nodes.

A client may contact the delivery node in the CDN using various known techniques including a HTTP and/or a DNS system. Further various streaming protocols may be used to deliver the content to the client. Such protocols may include HTTP and RTP type streaming protocols. In a preferred embodiment an adaptive streaming protocol such as HTTP adaptive streaming (HAS), DVB adaptive streaming, DTG adaptive streaming, MPEG DASH, ATIS adaptive streaming, IETF HTTP Live streaming and related protocols may be used.

The CDN is configured to ingest so-called spatially segmented content and distribute the spatially segmented content to a client. Spatially segmented content may be generated by spatially dividing each image frame of a source stream, e.g. an MPEG-type stream, into a number spatial segment frames. A time sequence of spatial segment frames associated with one particular area of an image frame may be organized in a separate spatial segment stream. The spatial segment frames in a spatial segment stream may be formatted according to a known transport container format and stored in a memory as a spatial segment file.

In order to handle ingestion of spatially segmented content and to delivery spatially segmented content to client the CDNCF uses a special data structure, which hereafter will be referred to as a spatial manifest file (SMF). A SMF may be stored and identified using the zzzz.smf file extension. The use of the SMF in CDN-based spatially segmented content delivery to a client will be described hereunder in more detail.

FIG. 2A-2E depict the generation and processing of spatially segmented content according to various embodiments of the invention.

Figure 2B:
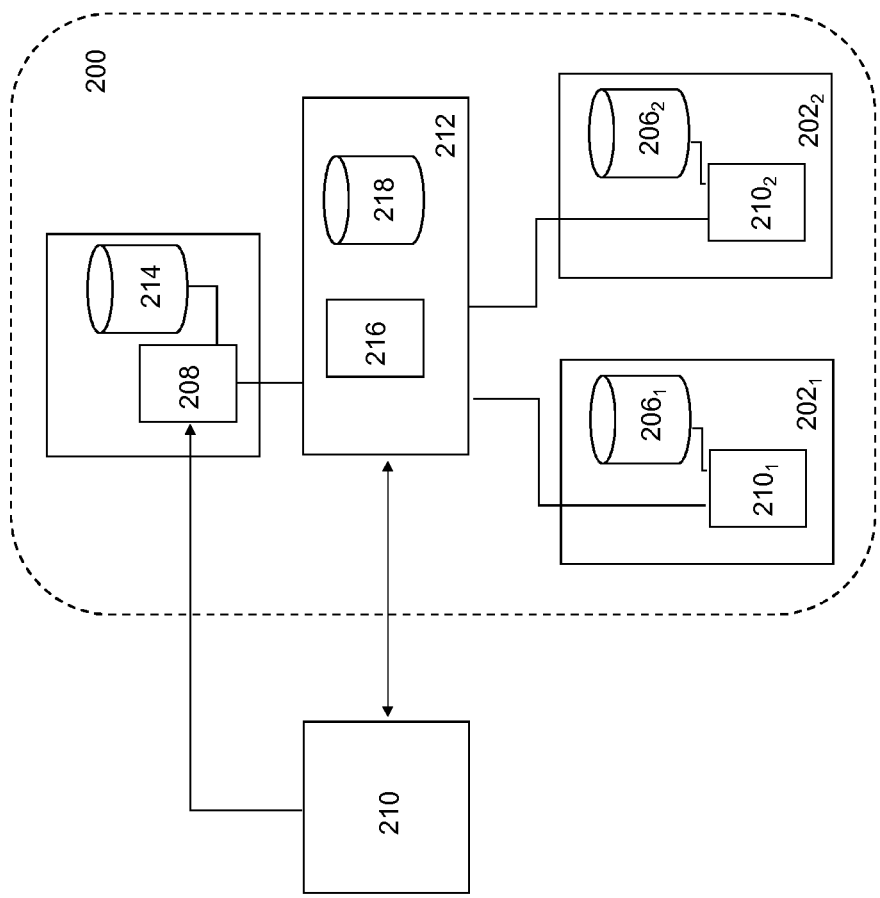
FIG. 2A-2E depict the generation and processing of spatially segmented content according to various embodiments of the invention.
Figure 2A:
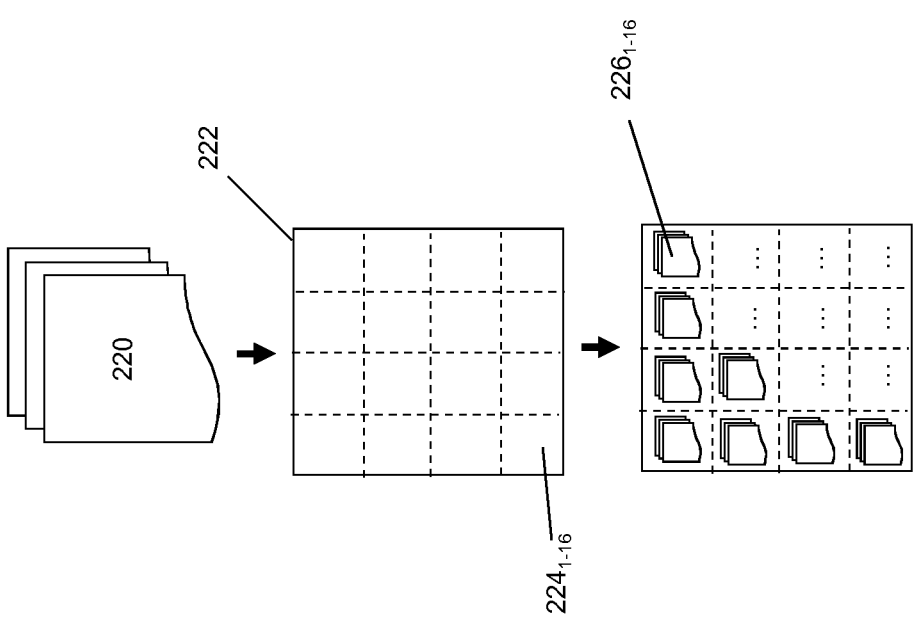

FIG. 2A schematically depicts an exemplary process for generating spatially segmenting content. A content provider may use the process in order to delivery such content via a CDN to a client. The process may be started by an image processing function generating one or more lower resolution versions of the high-resolution source stream 220. Thereafter, each image frame 222 in a lower resolution video stream is divided in separate, spatial segments frames $224_{1-16}$, wherein each spatial segment frame is associated with a particular area in the image frame. All spatial segment frames required for constructing an image frame of the original source stream is hereafter referred to as a spatial segment group.

In one embodiment, a spatial segment frame may comprise a segment frame header comprising spatial segment information, e.g. information regarding the particular position in an image frame it belongs to, sequence information (e.g. a time stamp) and resolution information.

A sequence of spatial segment frames associated with one particular area of an image frame of the source stream are subsequently encoded in a particular format, e.g. AVI or MPEG, and ordered in a spatial segment stream $226_{1-16}$ format. Each spatial segment stream may be stored as a spatial segment file, e.g. xxxx.m2ts or xxxx.avi. During segmentation, the image processing function may generate information for establishing the spatial relation between spatial segment streams and location information indicating where the spatial segment streams may be retrieved from.

It is submitted that the spatial division of image frames into a segment group is not limited to those schematically depicted in FIG. 2A. An image frame may be spatially divided into a segment group defining a matrix of spatial segment frames of equal dimension. Alternatively, in other embodiments, spatial segment frames in a segment group may have different segment frame dimensions, e.g. small segment frames associated with the center of the original image frame and larger sized spatial segment frames at the edges of an image frame.

The spatial segmentation process depicted in FIG. 2A may be repeated for different resolution versions of the source stream. This way, on the basis of one source stream, multiple spatial representations may be generated, wherein each spatial representation may be associated with a predetermined spatially segmented format of the source file.

The information establishing the spatial and/or temporal relation between spatial segment streams in each spatial representation and the location information, e.g. URLs, for retrieving the spatial segment streams may be hierarchically ordered and stored as a spatial manifest file (SMF). The structure of the SMF will be discussed in detail with reference to FIG. 3.

FIG. 2B depicts at least part of a CDN 200 according to one embodiment of the invention in more detail. The CDN may comprise one or more delivery nodes $202_{1-2}$, each comprising a controller $204_{1-2}$ and a delivery storage $206_{1-2}$. An ingestion node 208 is configured to receive spatially segmented content from a content processing entity 210, e.g. a content provider or another CDN, under control of the CDNCF.

In order to ingest spatially segmented content, a CDNCF 212 may receive a SMF from the content processing entity wherein the SMF comprises location information, e.g. URLs, where the spatially segmented content associated with the content processing entity is stored. Based on the location information in the SMF, the CDNCF may then initiate transport of spatial segment streams to the ingestion node, which may temporarily store or buffer the ingested content in an ingestion cache 214.

The CDNCF may further comprise a content deployment function 216 for distributing copies of spatial content segment streams to one or more delivery nodes in accordance with a predetermined distribution function. The function may use an algorithm, which allows distribution copies of the spatially segmented content over one or more delivery nodes of the CDN based on the processing load, data traffic and/or geographical proximity information associated with the delivery nodes in the CDN.

Hence, when receiving a content request from a client, the CDNCF may select one or more delivery nodes, which are e.g. close to the client and do not experience a large processing load. The different spatial segment streams associated with one SMF may be distributed to different delivery nodes in order to improve the efficiency of the CDN. For example, the more-frequently requested spatial segment streams positioned in the center of an image frame may be stored one multiple delivery nodes, while the less-frequently requested spatially segment streams positioned at the edge of an image frame may be stored on one delivery node.

Once the CDNCF has distributed ingested spatially segmented content to the delivery nodes, the CDNCF may modify location information in the SMF such that the modified SMF comprises references (URLs) to the delivery nodes to which the spatial segment streams were distributed. The thus modified SMF is stored in a SMF storage 218 with the CDNCF.

Figure 2C:
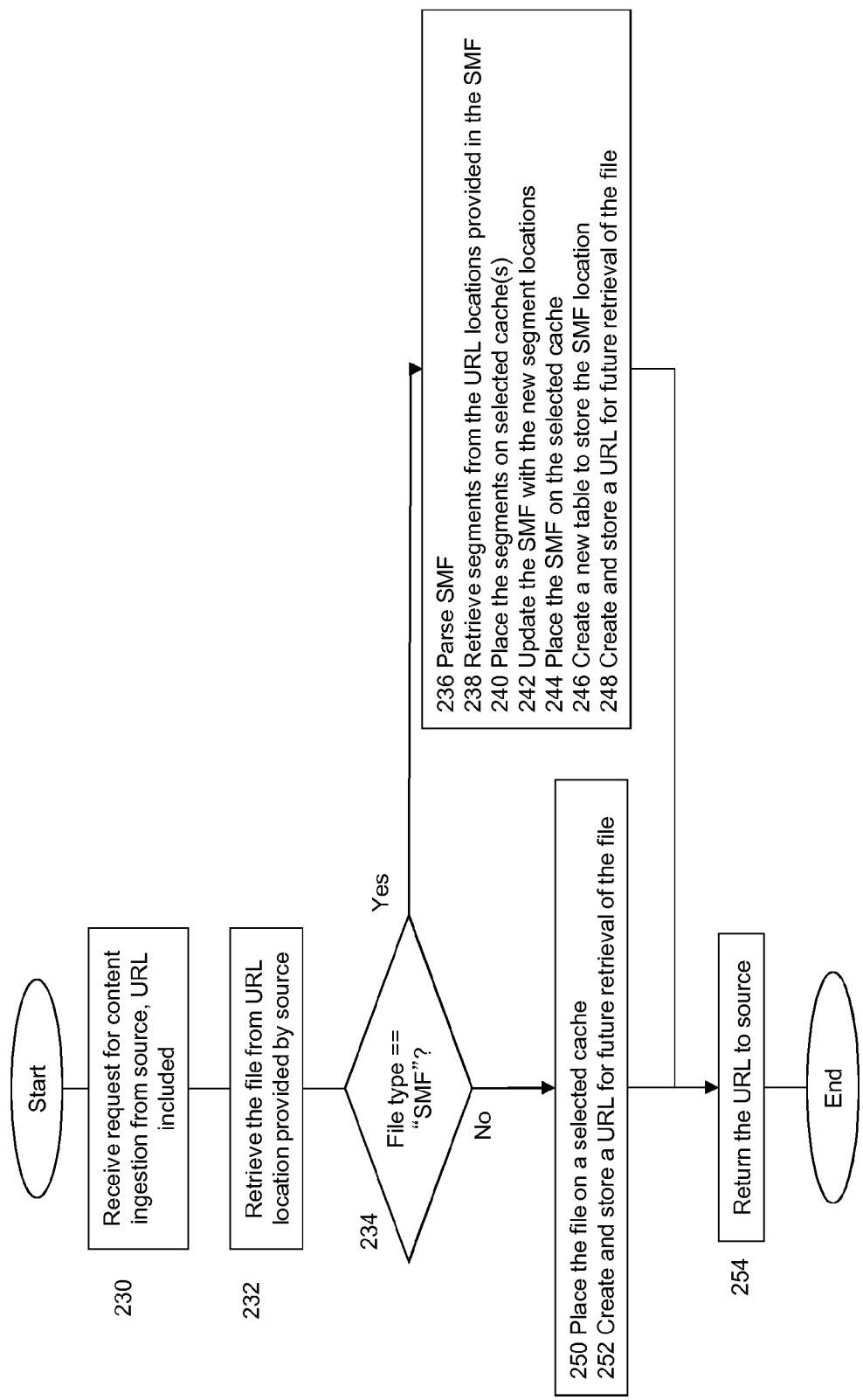
Figure 2D:
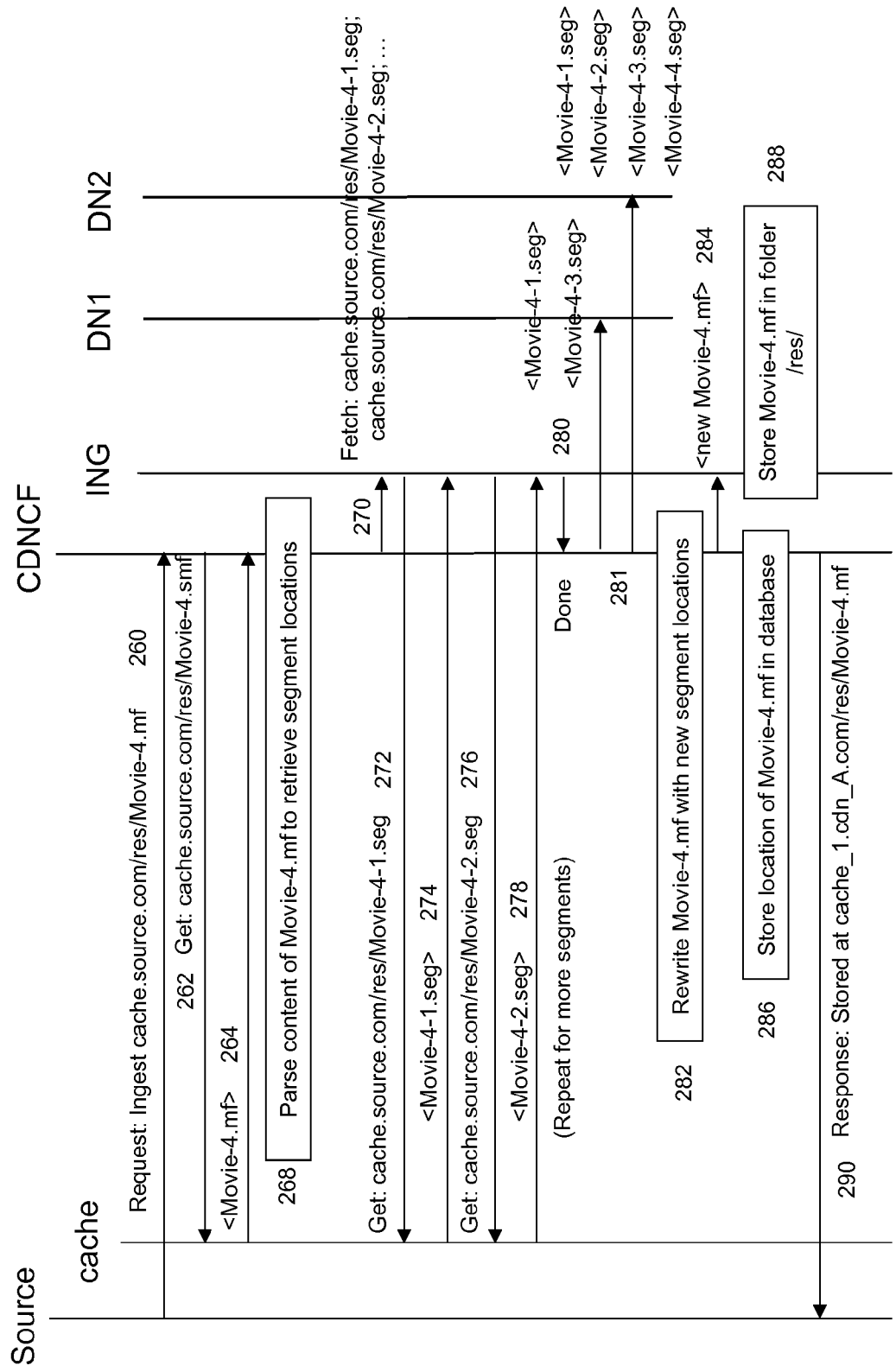

FIGS. 2C and 2D depict a flow chart and a sequence diagram respectively associated with a process of ingesting spatially segmented content in accordance with one embodiment of the invention. As shown in FIG. 2C, the process may start with the CDNCF receiving a request for content ingestion originating from a source, e.g. a content provider, a CDN or another content processing entity (step 230). The request may comprise location information, e.g. an URL, and a content identifier. In response, the CDNCF receives a file (step 232), which may either relate to a SMF (zzzz.smf) or a conventional, non-segmented content file.

If the CDNCF receives an SMF, it may execute ingestion of spatially segmented content on the basis of the received SMF (step 234). Execution of the ingestion process, may include parsing of the SMF (step 236) in order to retrieve the location information, e.g. URLs, associated with the spatial segment streams and instructing the ingestion node to retrieve the respective spatial segment streams and temporarily storing the ingested streams in the ingestion cache (step 238).

On the basis of processing load, data traffic and/or geographical proximity information associated with the delivery nodes in the CDN, the CDN deployment function may then distribute the spatial segment files over one or more predetermined content delivery nodes (step 240) and subsequently update the SMF by adding location information associated with the new locations of different delivery nodes where the spatial different segment files are stored (step 242). Optionally, URL may also send to the source (step 254).

The CDNCF may store the updated (modified) SMF with at least one of the delivery nodes (step 244) and generate a new entry in a SMF table associated with the CDNCF in order to store the location where the updated SMF may be retrieved for future use (step 246 and 248). Optionally, URL for locating the SMF may also be sent to the source (step 254).

If the source ingestion request of the source is associated with conventional non-segmented content, the content may be temporarily stored in the ingestion storage, where after the CDN deployment function distributes the content to on or more delivery nodes (step 250). A URL associate with the stored file may be generated and stored with the CDNCF for later retrieval (step 252). Optionally, URL for locating the content may also be sent to the source (step 254).

The sequence diagram of FIG. 2D depicts on embodiment of a process for ingesting spatially segmented content in more detail. In this example, the CDNCF and the source may use an HTTP-based protocol for controlling the content ingestion. The process may start with the source sending a content ingestion request to the CDNCF wherein the request comprises an URL pointing to a SMF named Movie-4.smf (step 260). The CDNCF may retrieve the SMF (steps 262 and 264) and parse the SMF (step 268) in order to retrieve the spatial segment file locations (e.g. in the form of one or more URLs).

Using the URLs, the CDNCF instructs the CDN ingestion node to fetch the spatial segment streams identified in the SMF, e.g. a source storage cache (step 270). After having received the spatial segment streams (steps 272-278), the ingestion node may notify the CDNCF that the content has been successfully retrieved (step 280). The CDNCF then may distribute copies of the ingested streams to the delivery nodes in the CDN. For example, on the basis of processing load, data traffic and/or geographical proximity information, the CDN deployment function may decide to distribute copies of the four spatially segment streams Movie-4-1.seg, Movie-4-2.seg, Movie-4-3.seg and Movie-4-4.seg to distribution node ND2 and the spatially segment streams Movie-4-1.seg and Movie-4-3.seg to DN1 (step 281).

After distribution to the delivery nodes, the CDNCF may update the SMF by inserting the location of the delivery nodes (in this case the URLs of DN1 and D2) from which the spatially segment streams may be retrieved into the SMF (step 282). The updated SMF may be stored with the spatially segment streams (step 284 and 288). The location of the SMF may be stored in a SMF table associated with the CDNCF (step 286). Optionally, the CDNCF may send a response comprising location information associated with the updated SMF to the source indicating successful content ingestion by the CDN (step 290).

Figure 2E:
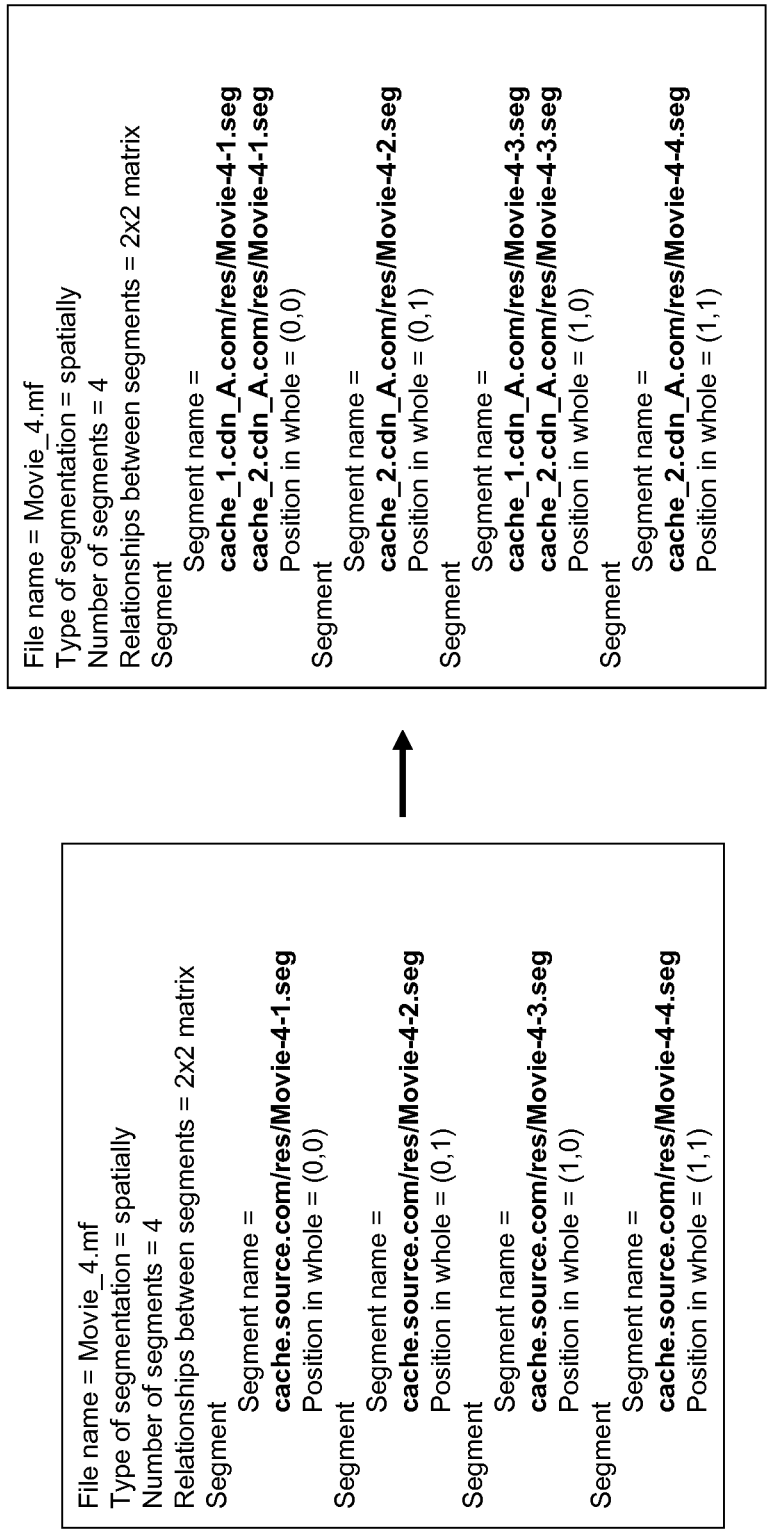

FIG. 2E depicts an example of part of an SMF before and after ingestion of spatially segmented content as described with reference to FIGS. 2C and 2D. The SMF 292 received from the source may comprise a content identifier, information regarding the segmentation, e.g. type of segmentation, the number of segments and the spatial relation between spatial segments from the different spatial segment files. For example the content of the exemplary SMF in FIG. 2E indicates that the spatially segment content was generated on the basis of a source file Movie_4. The SMF further indicates that four separate spatial segment streams Movie-4-1.seg, Movie-4-2.seg, Movie-4-3.seg and Movie-4-4.seg are stored at a certain location cache.source.com/res/ in the source domain.

After ingestion of the spatial segment files, the CDNCF may generate an updated SMF 294 comprising updated spatial segment locations in the form of URLs pointing towards a first delivery node cache_1.cdn_A/res/ comprising spatial segment streams Movie-4-1.seg and Movie-4-3.seg and a second delivery node cache_2.cdn_A/res/ comprising all four spatial segment streams Movie-4-1.seg, Movie-4-2.seg, Movie-4-3.seg and Movie-4-4.seg.

Hence, from the above it follows that the SMF allows controlled ingestion of spatially segmented content into a CDN. After ingestion, the SMF identifies the locations in the CDN where spatial segment streams may be retrieved. As will be described hereunder in more detail, the SMF may further allow a client to retrieve spatially segmented content and interact with it. In particular, the SMF allows client-controlled user-interaction with displayed content (e.g. zooming, panning and tilting operations).

Figure 3:
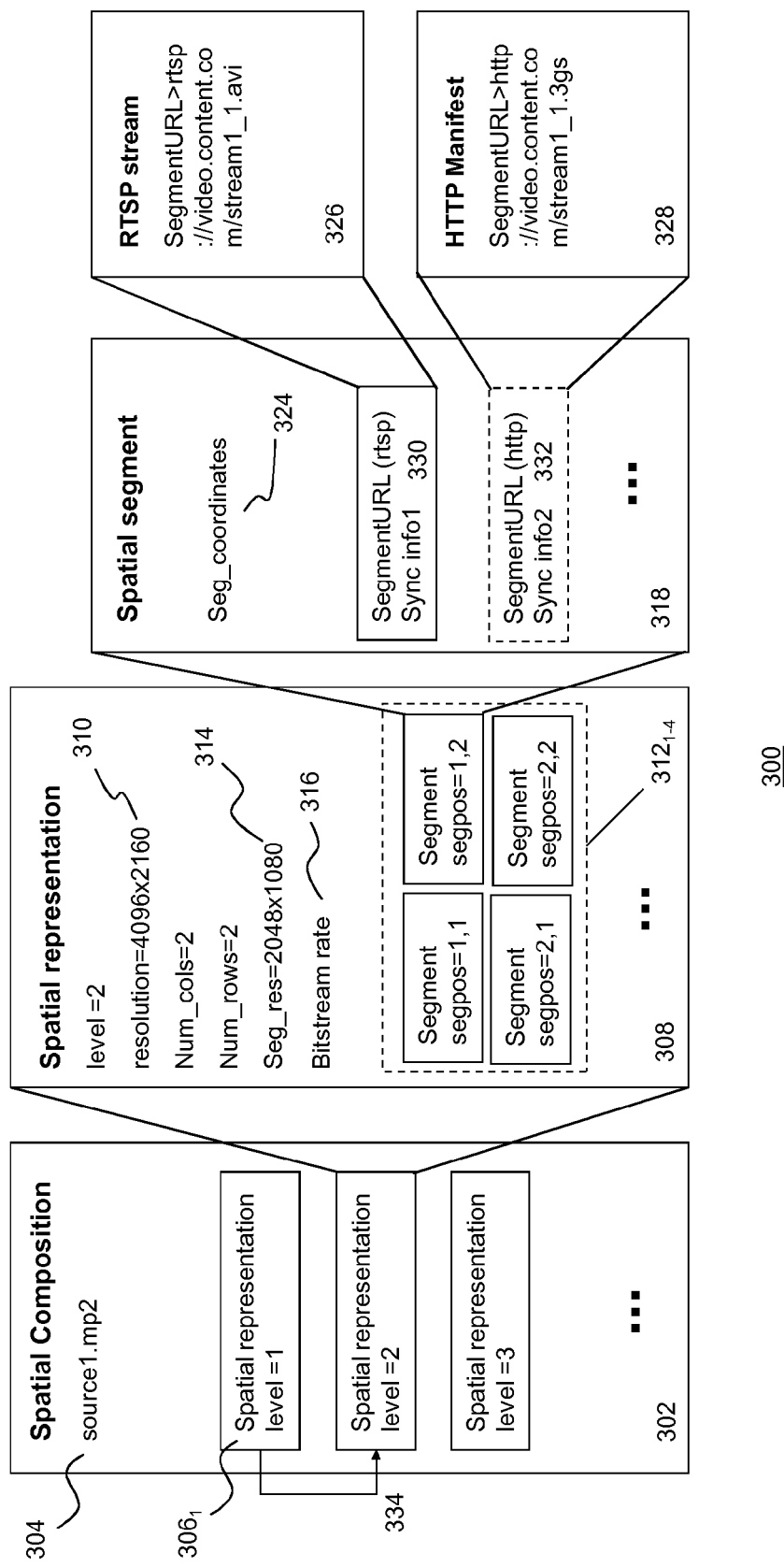
FIG. 3 depicts a SMF data structure according to one embodiment of the invention.

FIG. 3 schematically depicts a SMF data structure 300 according to one embodiment of the invention. An SMF may comprise several hierarchical data levels 302,308,318,328, wherein a first level 302 may relate to spatial composition information defining one or more so-called spatial representations $306_{1-3}$ of a source stream (e.g. source1. m2ts). Typically, the source stream may be a high-resolution and, often, wide-angle video stream.

The next data level 308 may relate to spatial representation information defining a spatial representation. In particular, spatial representation information may define the spatial relation between a set of spatial segment streams associated with a particular version, e.g. a resolution version, of the source stream.

The spatial representation information may comprise a set of spatial segment stream instances $312_{1-4}$ arranged in a spatial map 311. In one embodiment, the map may define a matrix (comprising rows and columns) of spatial segment stream instances, which allow construction of images comprising at least a part of the content carried by the source stream.

A spatial segment stream instance may be associated with a segment position $313_{1-4}$ defining the position of a segment within a positional reference system. For example, FIG. 3 depicts a matrix of spatial segment stream instances, wherein the spatial segment stream instances associated with segment positions (1,1) and (1,2) may refer to content associated with the top left and top right areas of video images in the source stream. On the basis of these two segment stream instances, video images may be constructed comprising content associated with the top half of the video images in the source file.

The spatial representation information may further comprise a source resolution 310 indicating the resolution version of the source stream, which is used to generate the spatial segment streams referred to in the spatial map. For example, in FIG. 3 the spatial segment streams referred to in the spatial map may be generated on the basis of a 4096×2160 resolution version of the source stream.

The spatial representation information may further comprise a segment resolution 314 (in the example of FIG. 3 a 2048×1080 resolution) defining the resolution of the spatial segment streams referred to in the spatial map and a segment bit-stream rate 316 defining the bitrate at which spatial segment streams in the spatial map are transmitted to a client.

A next data level 318 may relate to spatial segment information, i.e. information associated with a spatial segment stream instance in the spatial map. Spatial segment information may include position coordinates associated with spatial segment frames in a spatial segment stream 324. The position coordinates may be based on an absolute or a relative coordinate system. The position coordinates of the spatial segment frames in the spatial segment streams referred to in the spatial map may be used by the client to spatially align the borders of neighboring spatial segment frames into a seamless video image for display. This process is often referred to as "stitching".

Spatial segment information may further include one or more spatial segment stream locators 326,328 (e.g. one or more URLs) for locating delivery nodes, which are configured to transmit the particular spatial segment stream to the client. The spatial segment information may also comprise protocol information, indicating which protocol (e.g. RTSP or HTTP) is used for controlling the transmission of the streams to the client, and synchronization information 330, 332 for a synchronization module in the client to synchronize different segment streams received by a client.

The above-mentioned stitching and synchronization process will be described hereunder in more detail with reference to FIG. 9-11.

The SMF may further comprise inter-representation information 334 for relating a spatial segment stream in one spatial representation to spatial segment stream in another spatial representation. The inter-representation information allows a client to efficiently browse through different representations.

FIG. 4 depicts an example of part of an SMF defining a set of spatially segmented video representations of a (high resolution) source file using (pseudo-)XML according to one embodiment of the invention. This SMF defines different spatial representations (in this case three) on the basis of the source file source1.m2ts.

The first spatial representation in the SMF of FIG. 4 defines a single, 1024×540 pixel resolution non-segmented video stream (segment_mode=OFF). A client may retrieve the stream using the URL rtsp://video.content.com/full_stream.avi defined in the first spatial representation.

A second spatial representation in the SMF is associated with a 4096×2160 resolution source stream, which is spatially segmented in a 2×2 matrix (NumberOfColumns, NumberOfRows) comprising four spatial segment stream instances, each begin associated with a separate spatial segment stream of a 2048×1080 segment resolution and each being accessible by a URL. For example, the first segment stream associated with segment location (1,1) may be requested from the RTSP server using the URL rtsp://video.content.com/stream1_1.avi.

The SMF may define synchronization information associated with a spatial segment stream. For example, the SMF in FIG. 4 defines a predetermined RTP offset value for the RTSP server, which is configured to transmit the spatial segment stream stream1_1.avi to the client. The RTSP server uses the RTP protocol for streaming the spatial segment stream to the client. Normally, consecutive RTP packets in an RTP stream are time-stamped by the RTSP server using a random offset value as a starting value. Knowledge about the initial offset value is needed in order to synchronize different spatial segment streams at the client.

Hence, in order to enable the client to synchronize different RTP streams originating from different RTSP servers, the client may send a predetermined RTP offset value in the requests to the different RTSP servers, instructing each server to use the predetermined RTP offset in the request as the starting value of the RTP time stamping. This way, the client is able to determine the temporal relation between the time-stamped RTP streams originating from different RTSP servers.

A further, third spatial representation in the SMP may relate to a 7680×4320 resolution version of the source stream, which is segmented into a matrix comprising 16 spatial segment stream instances, each being associated with a 1920×1080 resolution spatial segment stream and each being accessible via predetermined URL.

Preferably, the resolution and aspect ratio of the spatially segment streams is consistent with common video encoding and decoding parameters, such as macro block and slice sizes. In addition, the resolutions of the spatial segment streams should be large enough as to retain a sufficient video coding gain.

Figure 5B:
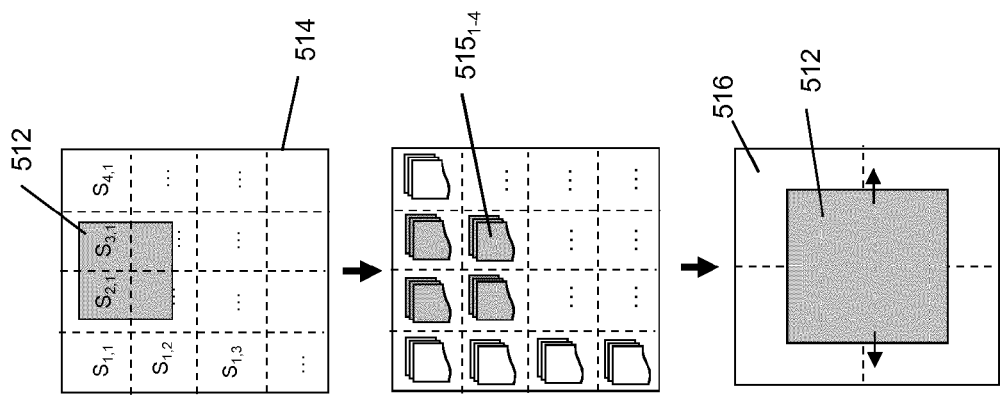
FIG. 5A-5C depict the process of a user interacting with a content processing device which is configured to process and display spatially segmented content according to an embodiment of the invention.
Figure 5A:
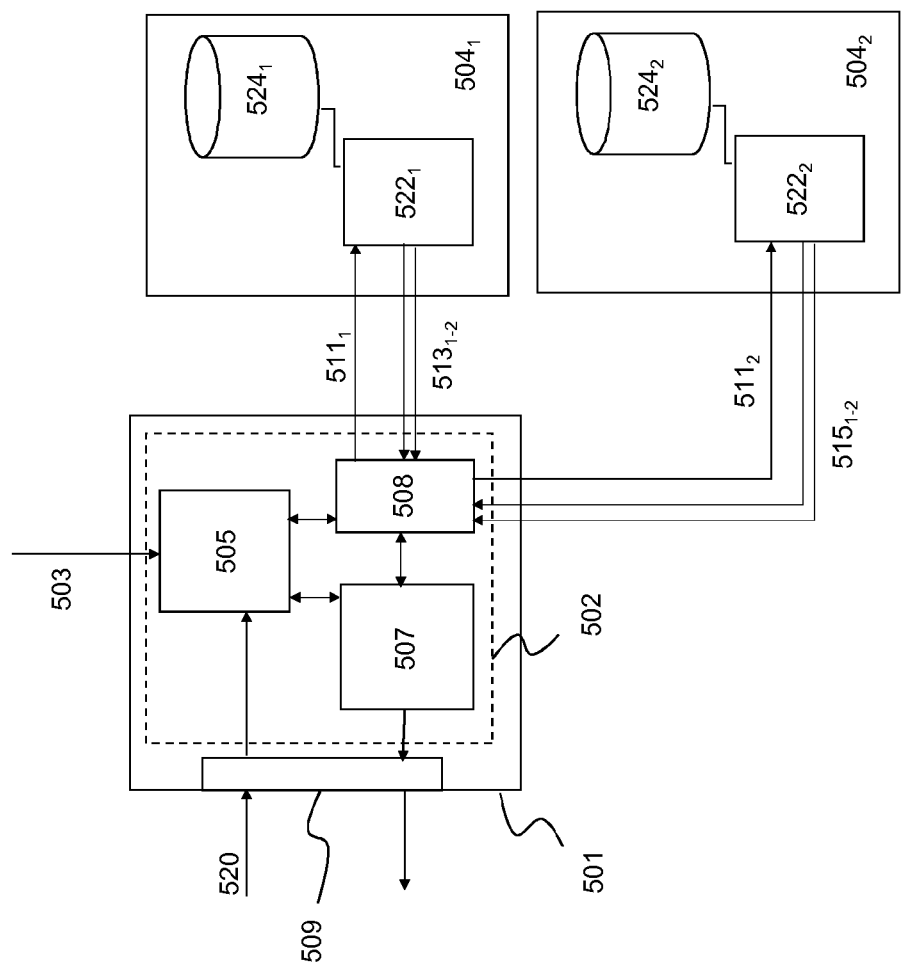
Figure 5C:
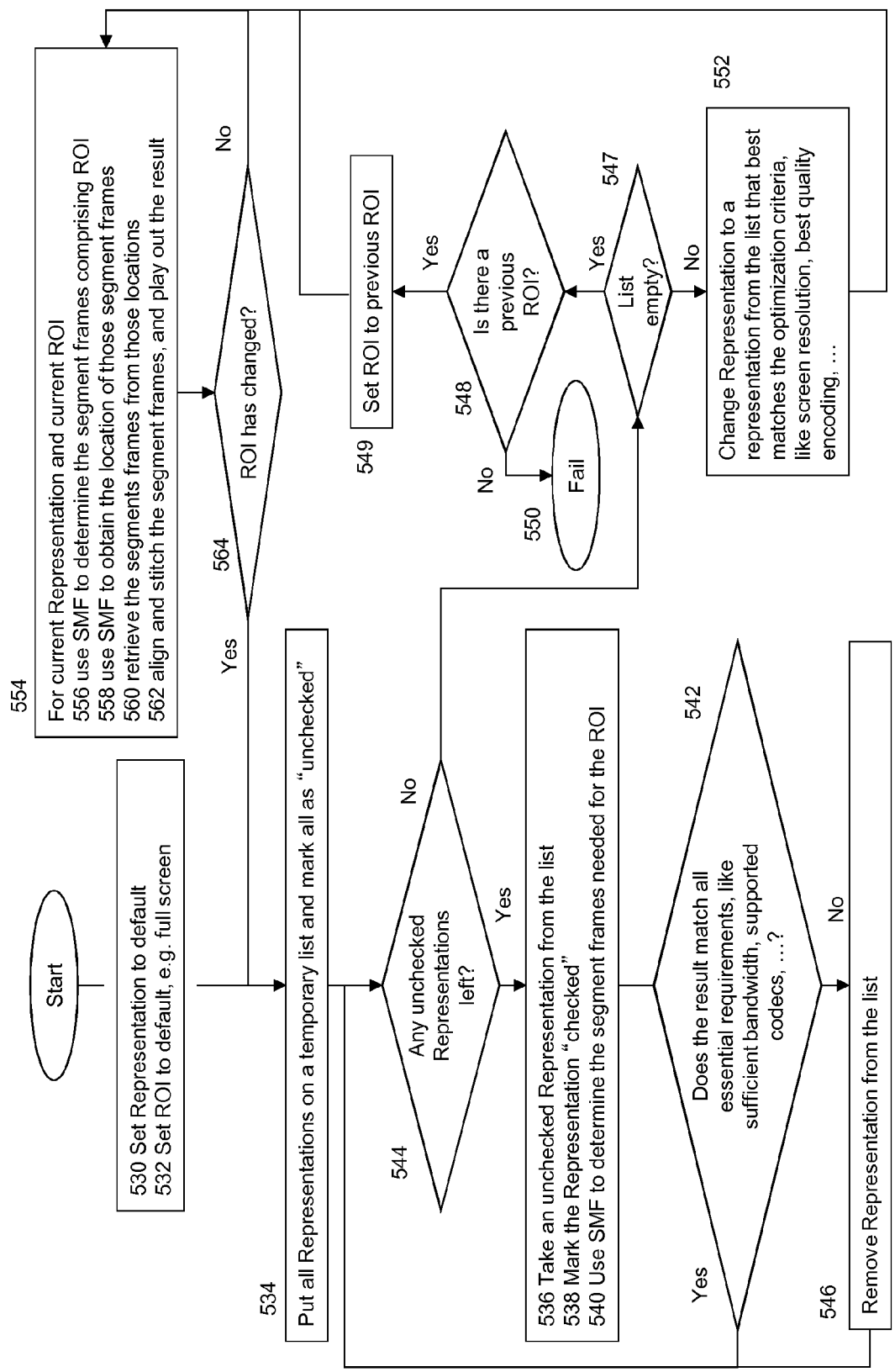

FIG. 5A-5C depict the process of a user interacting with a content processing device which is configured to process and display spatially segmented content according to an embodiment of the invention.

FIG. 5A depicts a content processing device 501 comprising a client 502 configured to directly retrieve spatial segment streams from one or more delivery nodes 504$_1$, 504$_2$. Each delivery node may comprise a controller 522$_1$, 522$_2$ and a delivery storage 524$_1$,524$_2$ for storing spatial segment streams.

The display of the content processing device may be configured as an interactive graphical user interface (GUI) 509 allowing both display of content and reception of user input 520. Such user input may relate to user-interaction with the displayed content including content manipulation actions such as zooming, tilting and panning of video data. Such GUIs include displays with touch-screen functionality well known in the art.

The client may comprise a control engine 505 configured for receiving a SMF 503 from a CDN and for controlling a media engine 507 and an access engine 508 on the basis of the information in the SMF and user input received via the GUI. Such user input may relate to a user-interaction with displayed content, e.g. a zooming action. Such user-interaction may initiate the control engine to instruct the access engine (e.g. an HTTP or RTSP client) to retrieve spatially segmented content using location information (URLs) in the SMF.

FIG. 5B schematically depicts a user interacting with the client through the GUI in more detail. In particular, FIG. 5A schematically depicts a user selecting a particular area 512 (the region of interest or ROI) of the display 514 as schematically depicted in FIG. 5B. On the basis of the size and coordinates of the selected ROI, the control engine may select an appropriate spatial representation from the SMF. A process for selecting an appropriate spatial representation will be described in more detail with reference to FIG. 5C.

In the example of FIG. 5B the control engine may have selected a spatial representation from the SMF comprising a matrix of 16 spatial segment stream instances wherein each spatial segment stream instance relates to content associated with a particular area in the display (as schematically illustrated by the dotted lines in display 514). The control engine may then determine the overlap between the ROI and the spatial areas associated with the spatial segment stream instances of the selected spatial representation.

This way, in the example of FIG. 5B, the control engine may determine that four spatial segment stream instances (gray-shaded spatial segment stream instances $S_{2,1};S_{3,1};S_{2,2};S_{3,2}$) overlap with the ROI. This way four spatial segment streams $515_{1-4}$ are identified by the control engine that allow construction of a new video stream 516 displaying the content in the ROI 512 to the user. The identified spatial segment stream instances comprising the ROI are hereafter referred to as a spatial segment subgroup.

With reference to FIG. 5A, after determining the spatial segment subgroup, the control engine 505 may instruct the access engine to request access to the delivery nodes configured to deliver the identified spatial segment streams (in this example two delivery nodes were identified). The access engine may then send a request $511_{1-2}$ to the controller of delivery nodes $504_1$ and $504_2$ to transmit the spatial segment streams to the client (in this example each delivery node delivers two spatial segment streams $513_{1-2}$ and $515_{1-2}$ to the client). The access agent 508 may forward the transmitted spatial segment streams to the media engine 507, which may comprise processing functions for buffering, synchronizing and decoding the spatial segment streams of the spatial segment subgroup and stitching decoded spatial segment frames to video images comprising the ROI.

FIG. 5C depicts a flow diagram for user-interaction and play-out of spatially segmented content on the basis of a SMF according to one embodiment of the invention. In particular, FIG. 5C depicts a flow diagram wherein a user initiates a zooming action by selecting a ROI.

The process may start with a client, in particular the control engine in the client, receiving a SMF and selecting one of the spatial representations as a default, e.g. a low bandwidth un-segmented version of the source stream (step 530). Further, the control engine may set the ROI to a default value, typically a value corresponding to full display size (step 532). If the control engine receives a ROI request, it may put all or at least part of the spatial representations on a temporary list and mark the spatial representations as "unchecked" (step 534). The control engine may then start a process wherein an unchecked spatial representation is taken from the list (step 536) and marked as checked (step 538). On the basis of the SMF, the control engine may then determine whether for the selected spatial representation a spatial segment subgroup exists, i.e. a spatial segment stream instances associated comprising the ROI (step 540)

Using the spatial representation information and the associated spatial segment information, the control engine may further verify whether an identified spatial segment subgroup matches the requirements for play-out, e.g. bandwidth, codec support, etc. (step 542). If the play-out requirements are met, the next "unchecked" spatial representation is processed. If the play-out requirements are not met, the control engine may remove the spatial representation from the list (step 546). Thereafter the next unchecked spatial representation is processed until all spatial representations on the list are processed (step 544).

Then, after having checked all spatial representations on the list, the client may check the list is empty (step 547). If the list is empty, the client may determine whether a previous ROI and spatial representation is available for selection (step 548). If so, that previous ROI may be selected for play-out (step 549). If no previous ROI is available, an error message may be produced (step 550). Alternatively, if the list with checked spatial representations is not empty, the content agent may select a spatial representation from the list that best matches the play-out criteria, e.g. screen resolution, quality, encoding, bandwidth, etc., and subsequently changes to that selected spatial representation (step 552).

The control engine may then execute a process for play-out of the spatially segmented streams using the newly selected spatial representation (step 554). In that case, the control engine may determine the spatial segment subgroup (step 556) and the locations information where the spatial segment streams in the spatial segment subgroup may be retrieved (step 558). After retrieving the spatial segment streams (step 560) they are processed for play-out (step 562), i.e. buffered, synchronized and stitched in order to form a stream of video images comprising the ROI.

During play-out of the spatially segmented content, the control engine may be configured to detect a further ROI request, e.g. a user selecting a further ROI via the GUI. If such signal is detected (step 564), the above-described process for building and checking a list of suitable spatial representations may be started again.

The spatial representations in the SMF thus allow a user to select different ROIs and to zoom in a video image by having the client to select different spatial segment streams defined in the one or more spatial representations in the SMF. The SMF allows a client to directly request spatially segmented content from delivery nodes in the CDN. Such direct retrieval provides fast access to the content, which is required necessary in order to deliver quality of services and optimal user experience.

Hence, instead of simply enlarging and up-scaling a selected pixel area of an image which results in a loss of fidelity, the client may simply use the SMF to efficiently switch to a desired spatial representation. For example, a spatial representation associated with a e.g. 960×640 resolution version of a source stream may be selected, so that the top-left quarter is displayed using a spatial segment stream of a 480×320 pixel resolution. This way, the selected spatial representation may allow a user to actually see more details when zooming in when compared with a conventional digital zooming situation based on up-scaling existing details in order to fit the entire display. Different spatial representations in the SMF may allow a user to zoom to a particular ROI without loosing fidelity and without requiring an excessive amount of bandwidth.

Figure 6A:
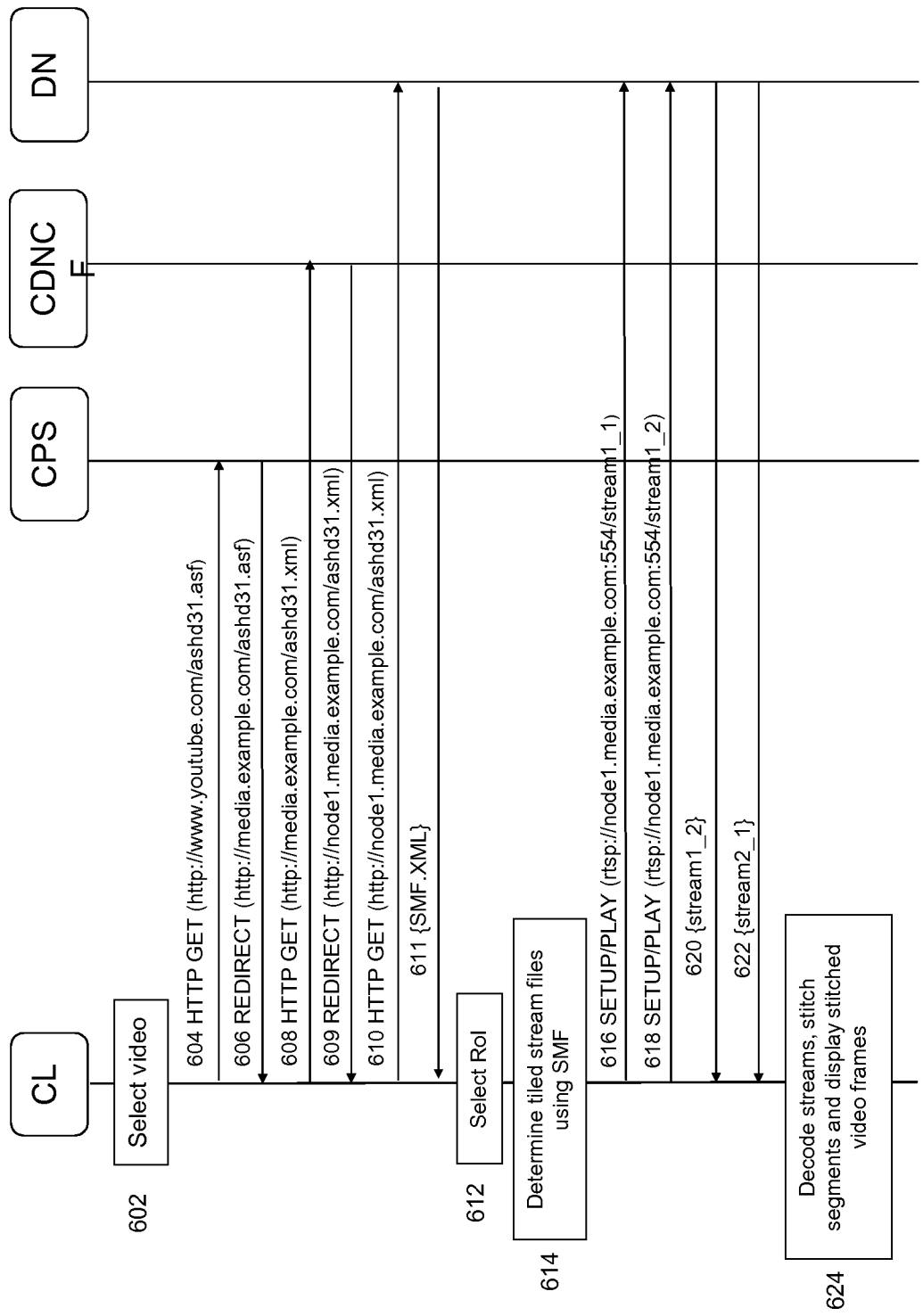
FIGS. 6A and 6B depict flow diagrams of processes for delivering spatially segmented content to a client according to various embodiments of the invention.

FIG. 6A depicts a flow diagram of a process for delivering spatially segmented content to a client according to an embodiment of the invention. In this particular, embodiment, the SMF is stored on the same delivery node DN as the spatial segment streams.

The process may start with the client selecting a particular media file ashd31.asf (step 602) and sending a HTTP GET to comprising a reference to the selected media file to a content provider system (CPS) (in this case YouTube™) (step 604). The CPS may in response generate a redirect to the CDNCF of a CDN for obtaining the SMF associated with the requested media file (steps 606 and 608). In response, the CDNCF may generate a redirect to a content delivery node at which the requested SMF is stored (steps 609 and 610). The delivery node may then send the requested SMF to the client.

Then as described above with reference to FIG. 5C, the client may receive a ROI request from the user (step 612) and—in response—the client may initiate a process for selecting a desired spatial representation and for determining the spatial segment subgroup, i.e. the spatial segment stream instances comprising the selected ROI (step 614).

The client may set up streaming sessions, e.g. RTSP streaming sessions, with the delivery node comprising the stored SMF (steps 616 and 618). Upon reception of the requested spatial segment streams (steps 620 and 622), the client may process the spatial segment streams for construction of video images comprising the selected ROI (step 624).

Figure 6B:
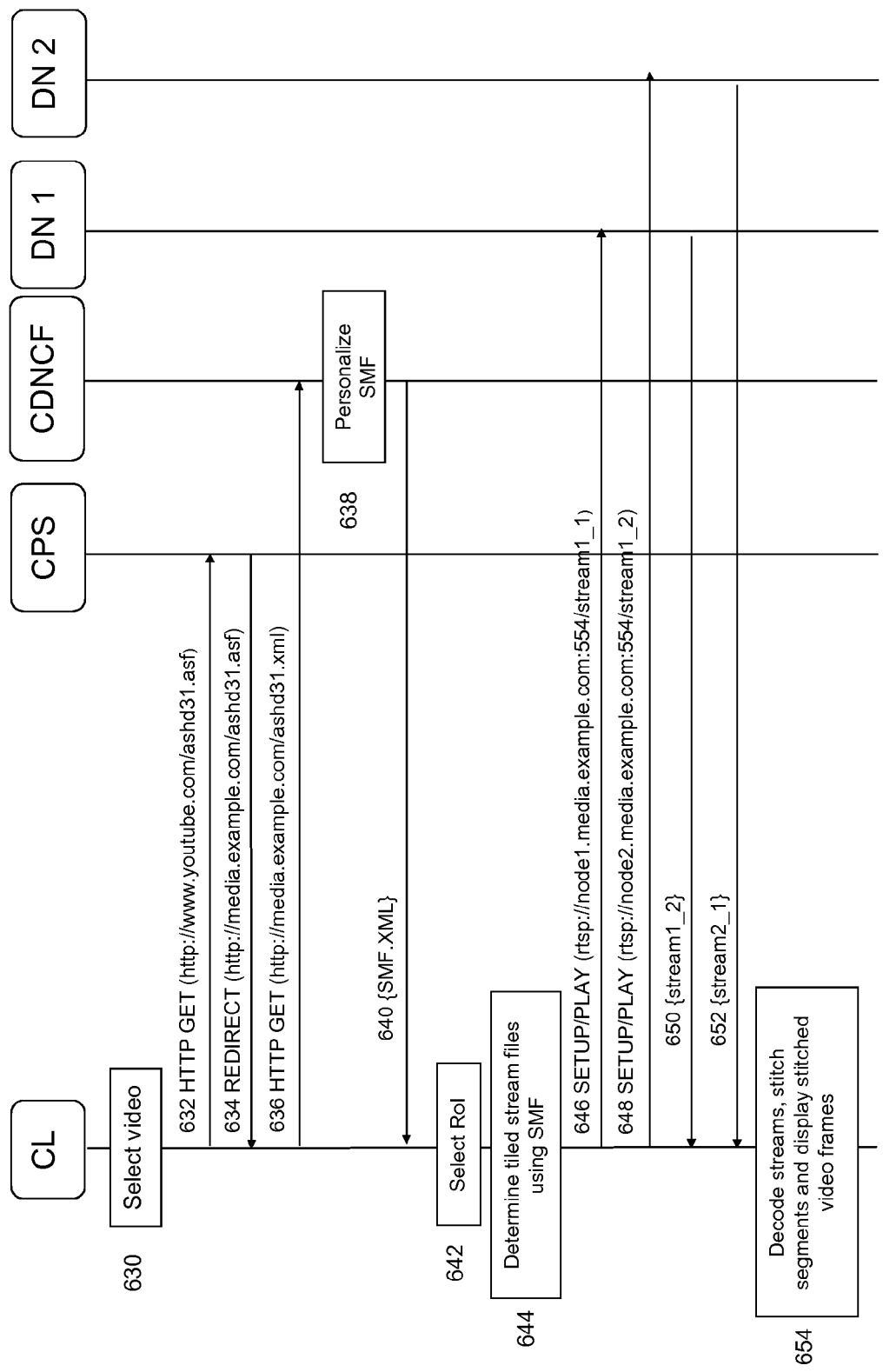

FIG. 6B depicts a flow diagram of client-controlled spatially segmented content delivery according to a further embodiment of the invention. In this case, the spatial segment streams are stored on different delivery nodes D1 and D2. In that case, the process may start in a similar way as in FIG. 6A. The process may start with the client selecting a particular media file ashd31.asf (step 630) and sending a HTTP GET comprising a reference to the selected media file to a content provider system (CPS) (in this case YouTube™) (step 632). In response the CPS may generate a redirect to the CDNCF of a CDN for obtaining the SMF associated with the requested media file (steps 634 and 636). Thereafter, the CDNCF may retrieve the SMF from the SMF storage associated with the CDNCF. The SMF may have a format similar to the one described with reference to FIG. 2E. In particular, for at least some of the spatial segment streams, the SMF may define two or more delivery nodes.

Hence, in that case the CDNCF will have to determine for each spatial segment stream, which delivery nodes is most suitable for transmitting the spatial segment stream to the client. For example, based on the location of the client some delivery nodes may be favorable over others. Moreover, some delivery nodes may be avoided due to congestion problems or heavy processing loads. This way, on the basis of the stored SMF, the CDNCF will generate a "personal" SMF by selecting for a client for each spatial segment stream the most suitable delivery nodes (step 638). This personal SMF is sent to the client (step 640).

The client may receive a ROI request from the user (step 642). Then, on the basis of the personal SMF, the client may initiate a process for selecting a desired spatial representation, for determining the spatial segment subgroup and for determining the locations of the delivery nodes for transmitting spatial streams in the spatial segment subgroup to the client (step 644).

Thereafter, the client may set up streaming sessions, e.g. RTSP streaming sessions, with the different identified delivery nodes, in this case a first and second delivery node D1 and D2 respectively, for transmitting the spatial segment streams to the client (steps 646-652). Upon reception of the requested spatial segment streams (steps 650 and 652), the client may process the spatial segment streams for construction of video images comprising the selected ROI (step 654). Hence, in the process of FIG. 6B, the client will receive an SMF, which is optimized in accordance with specific client and CDN circumstances, e.g. client-delivery node distance, processing load of the delivery nodes, etc.

While in FIGS. 6A and 6B the SMF retrieval is described on the basis of HTTP, various other protocols such as SIP/SDP, SIP/XML, HTTP/XML or SOAP may be used. Further, the request for spatial segment streams may e.g. be based on RTSP/SDP, SIP/SDP, SIP/XML, HTTP, IGMP. The segment delivery may be based on DVB-T, DVB-H, RTP, HTTP (HAS) or UDP/RTP over IP-Multicast.

The SMF defining multiple spatial representations of a source content stream may provides an efficient tool for ingestion of content in a CDN and/or for content delivery from a CDN to a client. It allows a client to efficiently determine spatial segment streams associated with a ROI and to directly retrieve these spatial segment streams for delivery nodes in a CDN. It further allows an efficient way for a user to interact with content (e.g. zooming and panning) without consuming excessive amounts of bandwidth in the CDN and in the access lines connecting the clients with the CDN. It is apparent that the a SMF allows for different advantageous ways of controlling spatially segmented content.

FIG. 7A-7C depict at least part of SMF according to various embodiments of the invention. FIG. 7A depicts part of an SMF according to one embodiment of the invention. In particular, the SMF in FIG. 7A defines the spatial position of a spatial segment frame in an image frame to be displayed. This way for example the left lower corner of spatial segment frames in a particular spatial segment stream may be related to an absolute display position 1000,500.

The use of such coordinate system allows segment frames in neighboring spatial segment streams to overlap thereby enabling improved panning and zooming methods. For example, an overlap may provide a smoother panning operation when switching to a neighboring spatial segment stream FIG. 7B depicts part of an SMF according to an embodiment of the invention comprising inter-representation information. When zooming within spatially segmented content comprising a large number of spatial representations each defining multiple spatial segment, it may be computationally expensive to find the desired one or more references to spatial segment streams associated with a particular ROI and a resolution version in another spatial representation.

For these situations it may be useful to configure the SMF to also comprise information about the correlation between different spatial representations wherein each spatial representation is associated with a particular resolution version of the spatially segmented video content. For example, the spatial segment stream at display position 1000,500 in the first spatial representation is related to a spatial segment stream at display position 500,250 in a second spatial representation and to a spatial segment stream at display position 250,125 in a third spatial representation.

The use of inter-representation information may be especially advantageous when combined with an absolute pixel coordinate system as described with reference to FIG. 7A. The inter-representation may for example simplify the matching of a ROI with the appropriate spatial representation during zoom operations.

FIG. 7C depicts part of an SMF according to an embodiment of the invention wherein normalized pixel coordinates is selected as the center of the video image frame) define an absolute position within an image frame associated with a spatial representation independent of the selected resolution version. Such normalized coordinate system may range from 0 to 1 using (0.5,0.5) as the origin. The use of such normalized coordinate system allows simpler switching between different spatial representations within a SMF during zooming operations.

Figure 8B:
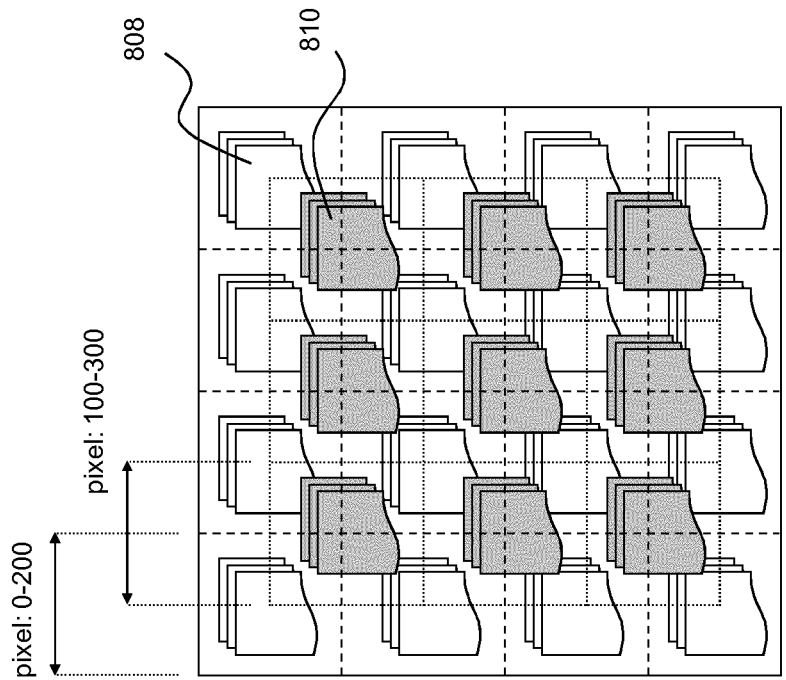
FIGS. 8A and 8B illustrate the use of different coordinate systems for defining the position of spatial segment frames in an image frame.
Figure 8A:
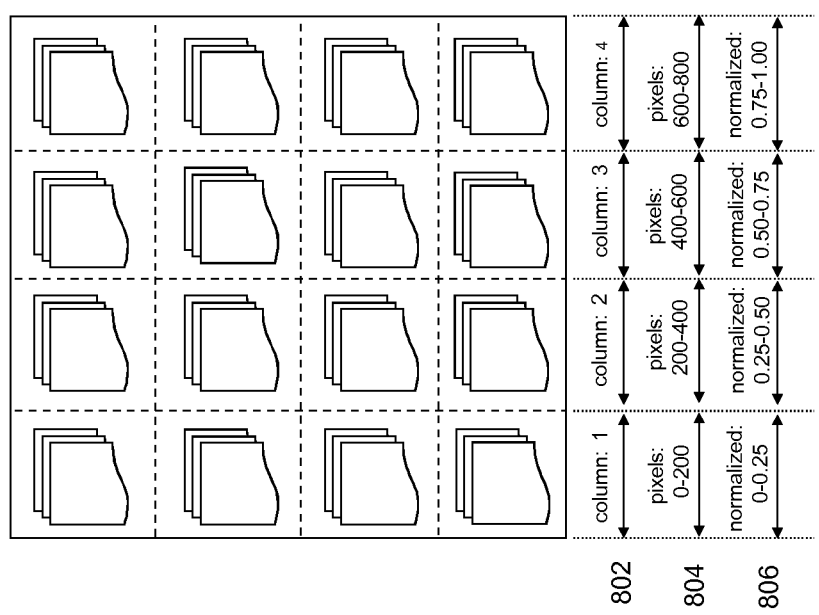

FIGS. 8A and 8B further illustrate the use of different coordinate systems for defining the position of spatial segment frames in an image frame. FIG. 8A depicts several different coordinate systems, i.e. a positioning system based on rows and columns 802, an absolute coordinate system

804 and a normalized coordinate system 806 for positioning a segment frame in an image frame. FIG. 8B depicts a single spatial representation comprising a matrix of spatial segment stream instances, whereby neighboring spatial segment frames overlap (e.g. 50% overlap).

In order to process and display content on the basis of individually transmitted spatial segment streams originating from different delivery nodes, specific functionality needs to be implemented in the client. In particular, frame level synchronization of spatial segment streams originating from different transmission nodes (such as the delivery nodes of a CDN) is needed so that the individual spatial segment frames may be stitched into a single image frame for display, wherein the image frame comprises the ROI.

Synchronization is required as the data exchange between the client and the delivery nodes is subjected to unknown delays in the network of various origins e.g. transmission delays, differences in network routes and differences in coding and decoding delays. As a consequence, requests may arrive at different delivery nodes at different times leading to different starting times of transmission of the spatial segment streams associated with one to be produced video.

Mavlankar et al. uses multiple instances of a media player for displaying tiled video streams simultaneously in a synchronized manner. Such solution however is not suitable for many low-power media processing devices, such as smart phones, tablets, etc. These devices generally allow only a single decoder instance running at the same time. Moreover, Mavlankar does not address the problem of synchronizing multiple segment streams originating from different delivery nodes. In particular, Mavlankar does not addresses the problem that between the request of new spatial segment streams and the reception of the spatially segment streams a delay is present and that this delay may vary between different delivery nodes in the CDN.

Buffering and synchronization issues may be avoided or at least significant reduced by encapsulating spatial segment streams in a single transport container. However, transport of the spatial segment streams in a single container significantly reduces the flexibility of streaming of spatially segmented content since it does not allow individual spatial segments streams to be directly streamed from different delivery nodes to a client. Hence, in order to maintain the advantages of the proposed method for spatially segmented content streaming synchronization of the spatial segment streams at the client is required.

Figure 9:
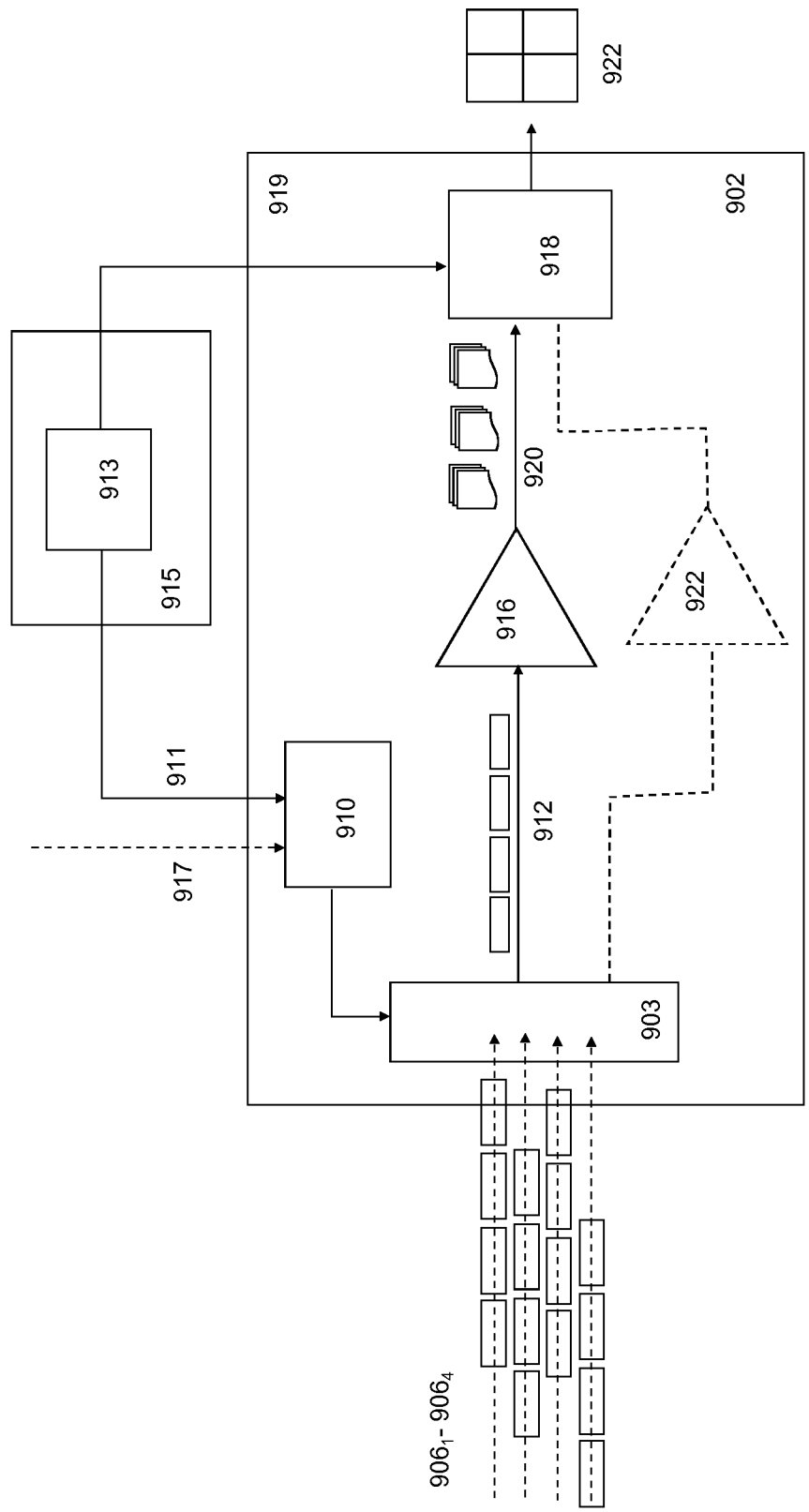
FIG. 9 depicts a schematic of a media engine according to an embodiment of the invention.
Figure 10:
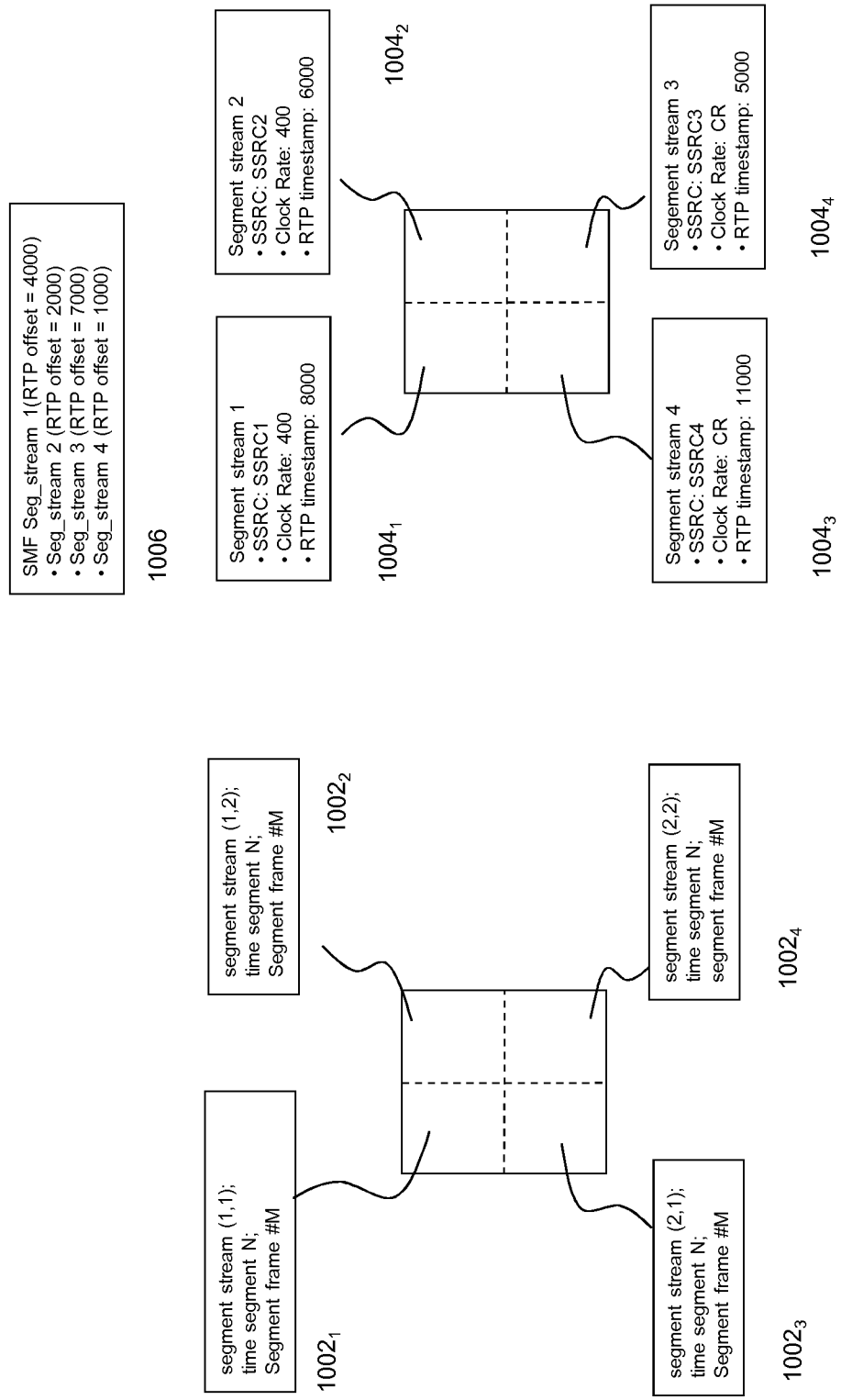
FIGS. 10A and 10B illustrate synchronized and stitched spatial segment frames based on different streaming protocols.

FIG. 9 depicts a schematic of a media engine 902 configured for synchronizing, decoding and spatial aligning spatial segment frames according to various embodiments of the invention. The media engine may be included in a client as described with reference to FIG. 5A.

The media engine 902 may comprise a buffer 903 comprising multiple adaptive buffer instances for buffering multiple packetized spatial segment streams $906_{1-4}$. Using synchronization information, the synchronization engine 910 may control the buffer in order to synchronize packets in the spatial segment streams.

Synchronization information may comprise timing information in the headers of the packets in a spatial segment stream. Such timing information may include time stamps, e.g. RTP time stamps, indicating the relative position of an image frame in a stream. Timing information may also relate to RTP time stamp information exchanged between an RTSP server and a client. In further embodiment, timing information may relate to time segments, e.g. DASH time segments specified in a HTTP DASH manifest file and time stamped frames (e.g. MPEG) or sequentially numbered frames (e.g. AVI) contained in such DASH time segment.

As already described with reference to FIG. 4, synchronization information 911, e.g. an RTP offset value, may also be included in the SMF 913 and sent by the control engine 915 to the synchronization module. In another embodiment, synchronization information 917 may be sent in an in-band or out-of-band channel to the synchronization engine.

The timing information may be used to control the one or more adaptive buffer instances in the buffer module. For example, on the basis of timing information of different spatial segment streams time delays for the adaptive buffer instances may be determined such that the output of the buffer may generate time-aligned (i.e. time-synchronized) packets.

Synchronized packets at the output of the buffer may be multiplexed by a multiplexer (not shown) into a stream of time-synchronized packets 912 comprising frames which are logically arrange in so-called groups of pictures (GOPs) so that a decoder 916 may sequentially decode the packets into a stream of decoded spatial segment frames 920. In a further embodiment, the media engine may comprise two or more decoders 920 for decoding data originating from the buffer.

In one embodiment, the decoded segment frames may be ordered in a sequence of spatial segment subgroups $921_{1-4}$. A stitching engine may stitch the spatial segment frames associated with each spatial segment subgroup into a video image frame comprising the ROI. The stitching engine may use e.g. the position coordinates in the SMF, in order to spatially align the spatial segment frames in the spatial segment subgroup into a seamless video image frame 922 for display to a user.

The process of image stitching encompasses the technique of reproducing a video image on the basis of spatial segments frames by spatially aligning the spatial segment frames of a spatial segment subgroup. In further embodiments, image-processing techniques like image registration, calibration and blending may be used to improve the stitching process. Image registration may involve matching of image features between two neighbouring spatial segment frames. Direct alignment methods may be used to search for image alignments that minimize the sum of absolute differences between overlapping pixels. Image calibration may involve minimizing optical differences and/or distortions between images and blending may involve adjusting colours between images to compensate for exposure differences.

FIGS. 10A and 10B illustrate synchronized and stitched spatial segment frames based on different streaming protocols. In particular, FIG. 10A depicts spatial segment frames (in this case four) which are synchronized and stitched into one image frame wherein the spatial segment frames are transported to the client using an adaptive streaming protocol, e.g. the HTTP adaptive stream (HAS) protocol as defined in MPEG DASH ISO-IEC_23001-6 v12.

Each HAS-type spatial segment stream may be divided into N equally sized temporal segments (hereafter referred to as spatio-temporal segments or ST segments). Each ST segment is associated with a particular period, e.g. 2-4 seconds, in a spatial segment stream. The position of a ST segment in the spatial segment stream is determined by a monotonically increasing (or decreasing) segment number.

Each ST segment further comprises a predetermined number of sequential spatial segment frames, wherein the position of a spatial segment frame in a ST segment may be determined by a monotonically increasing time stamp or frame number (depending on the used transport container).

For example, each numbered ST segment may comprise a predetermined number of monotonically numbered or time-stamped spatial segment frames. Hence, the (temporal) position of each spatial segment frame in a HAS-type spatial segment stream (or ST segment stream) is uniquely determined by a segment number and a frame number within that ST segment.

The division of a spatial segment stream in ST segments of equal length may be facilitated by using the video encoding parameters, such as the length and structure of the Group of Pictures (GOP), video frame rate and overall bit rate for each of the individual spatial segment streams.

The temporal format of a HAS-type spatial segment stream, e.g. the time period associated with each TS segment, the number of frames in a TS segment, etc., may be described in a HAS manifest file (see FIG. 3 wherein a HTTP spatial segment stream is defined in accordance with an HAS manifest file). Hence, in HAS-type spatially segmented content the SMF may define the spatial format of the content and may refer to a further manifest file, the HAS manifest file, for defining the temporal format of the content.

Synchronisation and stitching of spatial segment frames in ST segmented contend may be realized on the basis of the segment number and the frame number as illustrated in FIG. 10A For example, if the buffer in the media engine receives four separate ST segment streams $1002_{1-4}$, the synchronization engine may process the ST segment streams in accordance with a segment number (the time segment number N in FIG. 10A) and frame number (the segment frame number #M in FIG. 10A). For example, the synchronization engine may determine for each ST segment stream associated with matrix positions (1,1)(1,2)(2,1) and (2,2), a spatial segment frame associated with a particular segment number and frame number is selected by the synchronization engine and send to the output of the buffer.

The encoded spatial segment frames at the output of the buffer may be decoded and the decoded spatial segment frames may be stitched into a video image for display in a similar way as described with reference to FIG. 9.

FIG. 10B depicts spatial segment frames (in this example four) which are synchronized and stitched into one image frame wherein the spatial segment frames are transported to the client using the RTP/RTSP streaming protocol. In that case, the buffer may receive four RTP streams comprising time-stamped RTP packets. The value of the RTP time stamp increase monotonically and may start with a random RTP offset value. Hence, in order to determine the relation between spatial segment frames in different RTP-type spatial segment stream, knowledge of the RTP offset values is required.

As will be described hereunder in more detail, when requesting an RTSP server for a specific spatial segment stream, the RTSP server may signal RTP time stamp information to the client. On the basis of this RTP time stamp information the random RTP offset value may be determined. Alternatively, when requesting a specific spatial segment stream, the request may comprise a particular predetermined RTP offset value, which the RTSP server will use for streaming to the client. Such predetermined RTP offset value may be defined in the SMF (see for example FIG. 3).

Hence, the synchronization engine may receive the RTP offset values associated with the buffered spatial segment streams. These RTP offset values may be determined in the SMF 1006. Using the RTP offset values the synchronization engine may then determine the relation between RTP packets in each of the spatial segment stream. For example, in FIG. 10B, the synchronization engine may receive four RTP offset values associated with four different spatial segment streams $1004_{1-4}$. Using these offset values, the synchronization engine may then determine packets in each of the buffered spatial segment stream. For example, an RTP packet with RTP timestamp 8000 (and RTP offset 4000) in spatial segment stream (1,1) belongs to an RTP packet in spatial segment stream (1,2) with RTP timestamp 6000 and RTP offset 2000, to an RTP packet in spatial segment stream (2,1) with RTP time stamp 11000 and RTP offset 7000, and an RTP packet in spatial segment stream (2,2) with RTP time stamp 5000 and RTP offset value 1000.

The synchronization engine may send these packets to the output of the buffer. Where after the packets are decoded into spatial segment frames and stitched into a video image for display in a similar way as described with reference to FIG. 9.

The above described synchronization process allows frame-level synchronization of the spatial image frames which is required in order to construct seamless video images on the basis of two or more spatial segment streams.

Other known synchronization schemes such as the use of so-called RTCP Sender Reports, which rely on the less accurate NTP clock information are not suitable for synchronization of spatial segment streams.

Figure 11:
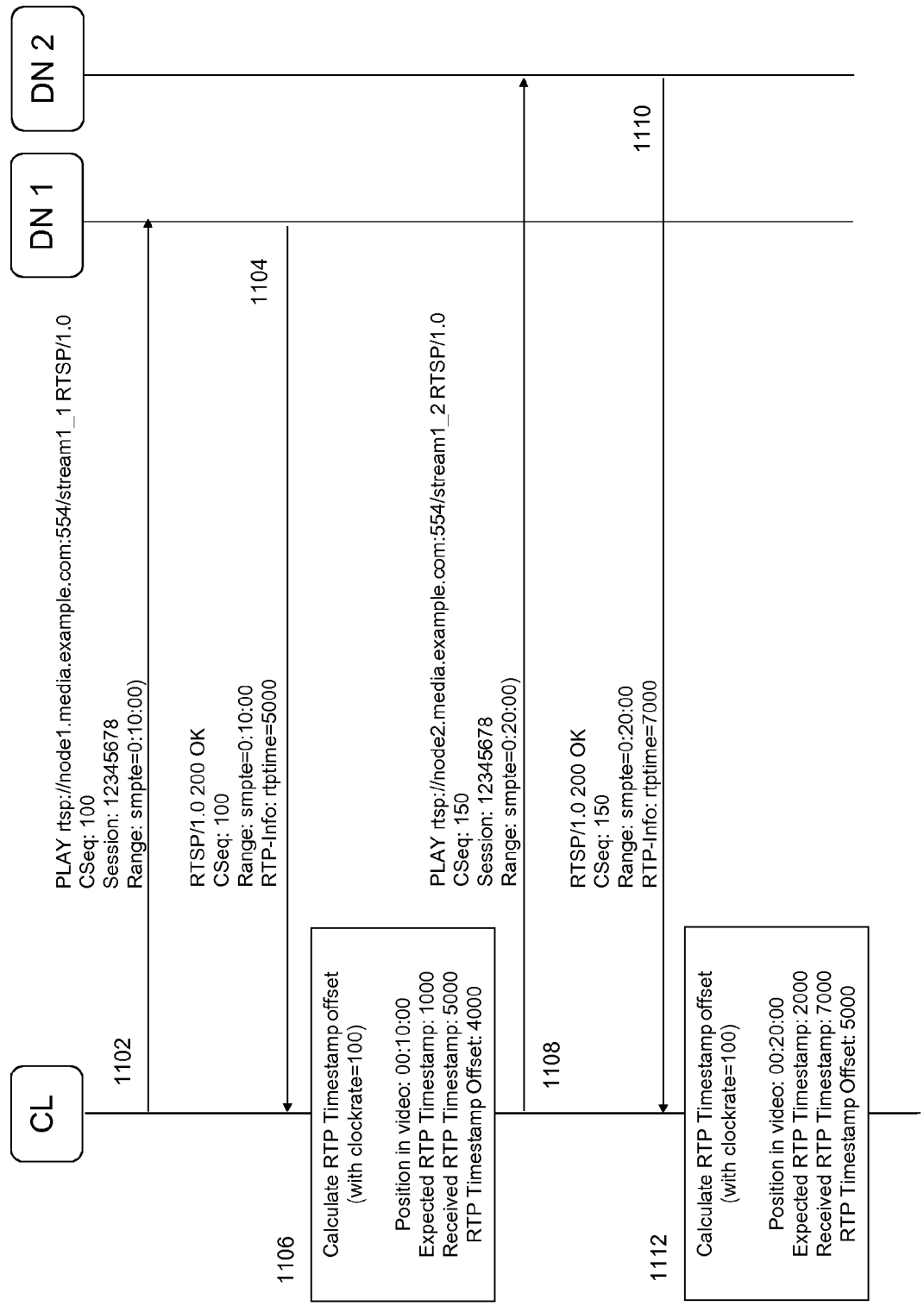
FIG. 11 depicts a process for determining synchronization information for synchronizing spatially segment content according to an embodiment of the invention.

FIG. 11 depicts a process 1100 for determining synchronization information for synchronizing spatially segment content according to an embodiment of the invention. In particular, FIG. 11 depicts a process for determining RTP offset values associated with different spatial segment streams. The process may start with a client sending an RTSP PLAY request to a first delivery node DN1, requesting the RTSP server to start streaming a first spatial segment stream stream1_1RTSP to the client starting. The range parameter in the RTSP PLAY request instructs the RTSP server to start streaming at position t=10 seconds in the stream (step 1102). In response, DN 1 sends an RTSP 200 OK response to the client confirming that it execute the request. Moreover, the RTP-info field in the response indicates that the first packet of the stream will have RTP time stamp 5000 (step 1104). Then, on the basis of the streaming clock rate of 100 frames per second, the client may calculate an expected RTP time stamp of 1000 (i.e. 100×10 second). The RTP offset value of 4000 may then be determined by subtracting the received RTP time stamp from the expected RTP timestamp (step 1106).

In a similar way, at t=20 seconds the client may then request a further spatial segment stream stream 1_2 from a second delivery node DN2 (step 1108). In response, DN2 sends an RTSP 200 OK message to the client indicating that the first RTP packet will have RTP time stamp 7000 (step 1110). Using this information, the client may then determine that the RTP timestamp offset for the second spatial segment stream is 5000 (step 1112). Hence, on the basis of RTP timing information in the RTSP signalling between the client and the delivery nodes, the client may efficiently determine the RTP offset values associated with each spatial segment stream.

Figure 12:
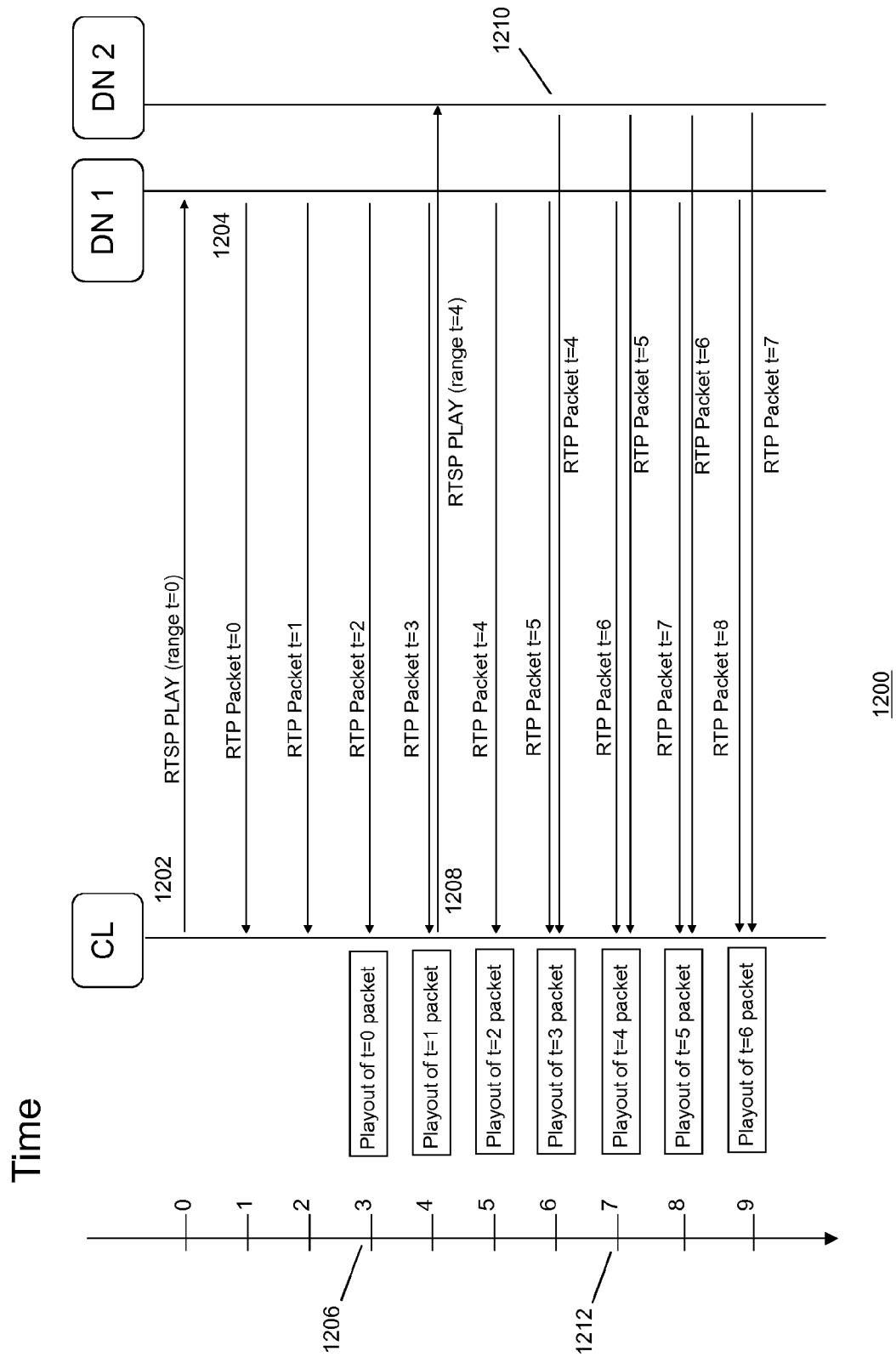
FIG. 12 depicts an example of a client requesting content from two different delivery nodes.

From the above, it follows that the SMF allows a client to directly access different delivery nodes in a CDN so that fast content delivery is achieved. Fast content delivery is required in order to allow good user-interaction, e.g. zooming and panning, with displayed spatially segmented content. Some delay between request and reception of content is however inevitable. These delays may also differ between different delivery nodes in a CDN. FIG. 12 depicts an example of a client requesting content from two different delivery nodes DN1 and DN2.

At t=0 the client may send an RTSP PLAY request to DN1 (step 1202). In response to the request, DN1 may start sending RTP packets to the client (step 1204). Due to some delays, RTP packet associated with t=0 will be received by the client at t=1. Similarly, the RTP packet transmitted at t=1 will be received by the client at t=2 and the RTP packet transmitted at t=2 will be received by the client at t=3. At that moment the client may decide to start play-out of the first RTP packet t=0 (step 1206), while the other two RTP packets t=1 and 2 are still buffered.

Then, while watching play-out of RTP packet t=1, the user may decided at t=4 to request a panning operation. In response to this request, the client may request streaming of a predetermined spatial segment stream from a second delivery node DN2 starting from t=4 (i.e. range parameter is set to t=4)(step 1208). DN2 however has a slower response time, so that it sends the RTP packet t=4 at t=6 to the client (step 1210). Due to this delay, the client is only capable of displaying the spatial segment stream originating from DN2 at t=7 (step 1212), 3 seconds after the user has initiated the panning request. Hence, schemes are desired to reduce the effect of the delay as much as possible.

Figure 13:
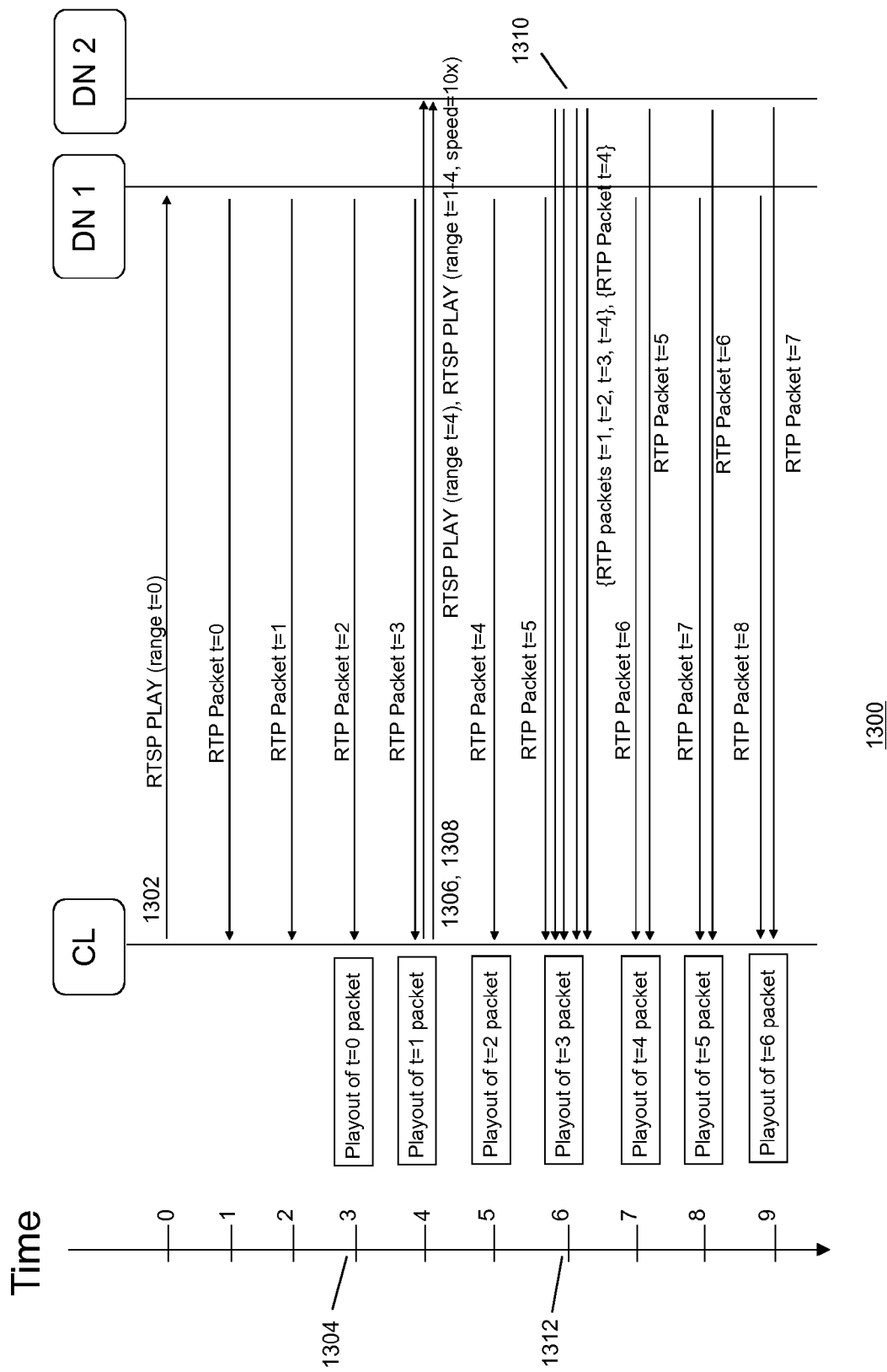
FIG. 13 depicts a process for improving the user-interaction with the spatially segmented content according to an embodiment of the invention.

FIG. 13 depicts a process for improving the user-interaction with the spatially segmented content according to an embodiment of the invention. In particular, FIG. 13 depicts a client and two delivery nodes similar to those described with reference to FIG. 12 (i.e. a first delivery node DN1 with a response of 1 second and a slower second delivery node DN2 with a response delay of 2 seconds).

After requesting DN1 to start streaming a first spatial segment stream from starting position t=0 (step 1302), the client may start play-out of the RTP packets at t=3 (i.e. after having buffered two RTP packets)(step 1304). Then, while watching play-out of RTP packet t=1, the user may decide at t=4 to request a panning operation. In response to this request, the client may send two RTSP PLAY request to the second delivery node DN2: a first RTSP PLAY request requesting the second delivery node to start streaming the second spatial segment stream starting from position t=4s (using the range parameter in the RTSP PLAY request) (step 1306); and, a second RTSP PLAY request requesting DN2 to start streaming the second spatial segment stream from position t=1 to position t=4 at a faster-than-real time streaming rate (using the range parameter and a SPEED parameter in the RTSP PLAY request) (step 1308).

In response, (at t=6) the second delivery node may start sending RTP packets t=1, 2, 3 and 4 at an increased rate to the client (step 1310) so that at t=6 the client may start play-out of RTP packet t=3 from the second delivery node (step 1312). At the same time, the first RTSP PLAY request may initiate transmission of RTP packets at a normal rate so that once the client play-out has arrived at t=4, the delivery of RTP packets at an increased rate may be terminated. This way, the user will notice the panning operation with a delay of two second, thus decreasing effects in the user-interaction due to network delays.

A temporarily delivery of RTP packets at an increased rate may be used in Video-on-Demand situations. For lifestreaming situations, which do not allow faster-than-real-time streaming, another solution may be used. In that case, fast-channel change techniques based on IP-Multicast as described in the IEFT document "Unicast-based rapid acquisition of multicast RTP sessions" http://tools.ietf.org/html/draft-ietf-avt-rapid-acquisition-for-rtp-17 may be used.

It is to be understood that any feature described in relation to any one embodiment may be used alone, or in combination with other features described, and may also be used in combination with one or more features of any other of the embodiments, or any combination of any other of the embodiments.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The invention is not limited to the embodiments described above, which may be varied within the scope of the accompanying claims.

The invention claimed is:

1. Method for processing spatially segmented content, the method comprising:
a content processing device comprising a client receiving a spatial manifest data structure comprising one or more spatial representations of a source stream, at least one spatial representation identifying (i) a plurality of independently retrievable spatial segment streams, each spatial segment stream of the plurality of independently retrievable spatial segment streams including a sequence of spatial segment frames associated with a particular area of an image frame, and (ii) location information for locating one or more delivery nodes associated with a content delivery network configured to transmit said plurality of independently retrievable spatial segment streams to said client, said spatial manifest data structure further comprising respective positioning information for each spatial segment stream of the plurality of independently retrievable spatial segment streams, wherein the positioning information is usable for stitching spatial segment frames in said spatial segment streams into a video frame for display;
selecting, on the basis of the spatial manifest data structure, one or more spatial segment streams associated with at least one of said one or more spatial representations and requesting, on the basis of said location information, at least one delivery node associated with said content delivery network to deliver said at least one selected spatial segment stream to said client; and
receiving said one or more selected spatial segment streams from said at least one delivery node.

2. Method according to claim 1, said positioning information being position coordinates associated with spatial segment frames in a spatial segment stream.

3. Method according to claim 1 wherein said spatial manifest data structure comprises at least a first spatial representation associated with a first resolution version of said source stream and at least a second spatial representation associated with a second resolution version of said source stream.

4. Method according to claim 1 wherein said spatial manifest data structure comprises a first spatial representation associated with a first number of spatial segment streams and said second spatial representation comprises a second number of spatial segment streams.

5. Method according to claim 1, further comprising:
buffering said one or more selected spatial segment streams;
receiving synchronization information associated with said one or more spatial segment streams; and
synchronizing said one or more requested spatial segment streams on the basis of said synchronization information.

6. Method according to claim 1 comprising:
on the basis of said positioning information stitching said spatially aligned spatial segment frames into a continuous video frame for play-out.

7. Method according to claim 1 wherein said one or more requested spatial segment streams are transmitted to said client using an adaptive streaming protocol, wherein at least part of said spatial segment streams is divided in time segments.

8. Method according to claim 7, wherein the adaptive streaming protocol is an HTTP adaptive streaming protocol.

9. Method according to claim 1 wherein said one or more spatial segment streams are transmitted to said client using an RTP streaming protocol and wherein synchronization information is transmitted to said client in an RTSP signaling message.

10. Method according to claim 1, wherein neighboring spatial segment frames overlap.

11. Method according to claim 10, wherein said overlap is at least 50%.

12. A content processing device comprising:
one or more processors and stored instructions that, when executed by the one or more processors, cause the content processing device to carry out operations of a client for processing spatially segmented content, the operations of the client including:
receiving a spatial manifest data structure comprising one or more spatial representations of a source stream, at least one spatial representation identifying (i) a plurality of independently retrievable spatial segment streams, each spatial segment stream of the plurality of independently retrievable spatial segment streams including a sequence of spatial segment frames associated with a particular area of an image frame, and (ii) location information for locating one or more delivery nodes associated with a content delivery network configured to transmit said plurality of independently retrievable spatial segment streams to said client, said spatial manifest data structure further comprising respective positioning information for each spatial segment stream of the plurality of independently retrievable spatial segment streams, wherein the positioning information is usable for stitching spatial segment frames in said spatial segment streams into a video frame for display;
selecting, on the basis of the spatial manifest data structure, one or more spatial segment streams associated with at least one of said one or more spatial representations and on the basis of said location information requesting at least one delivery node in said content delivery network to transmit said one or more selected spatial segment streams to said client; and
receiving said one or more selected spatial segment streams from said at least one delivery node; and
a display configured to display said received one or more selected spatial segment streams.

13. The content processing device according to claim 12, wherein the client operations further include:
buffering said one or more selected spatial segment streams;
receiving synchronization information associated with said one or more spatial segment streams; and
synchronizing said one or more requested spatial segment streams on the basis of said synchronization information.

14. The content processing device according to claim 12, wherein the client operations further include stitching spatial segment frames on the basis of position information in said spatial manifest data structure.

15. A non-transitory computer-readable medium having instructions stored thereon that, when executed by one or more processors, cause the one or more processors to carry out operations including:
causing a client to receive a spatial manifest data structure comprising one or more spatial representations of a source stream, at least one spatial representation identifying (i) a plurality of independently retrievable spatial segment streams, each spatial segment stream of the plurality of independently retrievable spatial segment streams including a sequence of spatial segment frames associated with a particular area of an image frame, and (ii) location information for locating one or more delivery nodes associated with a content delivery network configured to transmit said plurality of independently retrievable spatial segment streams to said client, said spatial manifest data structure further comprising respective positioning information for each spatial segment stream of the plurality of independently retrievable spatial segment streams, wherein the positioning information is usable for stitching spatial segment frames in said spatial segment streams into a video frame for display;
selecting, on the basis of the spatial manifest data structure, one or more spatial segment streams associated with at least one of said one or more spatial representations and requesting, on the basis of said location information, at least one delivery node associated with said content delivery network to deliver said at least one selected spatial segment stream to said client; and
receiving said one or more selected spatial segment streams from said at least one delivery node, and
a display configured to display said received one or more selected spatial segment streams.

16. A content processing device comprising:
one or more processors and stored instructions that, when executed by the one or more processors, cause a client to carry out operations for processing spatially segmented content, the operations including:
receiving a spatial manifest data structure comprising one or more spatial representations of a source stream, at least one spatial representation identifying (i) a plurality of independently retrievable spatial segment streams, each spatial segment stream of the plurality of independently retrievable spatial segment streams including a sequence of spatial segment frames associated with a particular area of an image frame, and (ii) location information for locating one or more delivery nodes associated with a content delivery network configured to transmit said plurality of independently retrievable spatial segment streams to said client, said spatial manifest data structure further comprising respective positioning information for each spatial segment stream of the plurality of independently retrievable spatial segment streams, wherein the positioning information is usable for stitching spatial segment frames in said spatial segment streams into a video frame for display;

selecting, on the basis of the spatial manifest data structure, one or more spatial segment streams associated with at least one of said one or more spatial representations and on the basis of said location information requesting at least one delivery node in said content delivery network to transmit said one or more selected spatial segment streams to said client; and receiving said one or more selected spatial segment streams from said at least one delivery node; and a communication interface configured to communicate with a display.

* * * * *